US012592880B2

(12) United States Patent
Shen et al.

(10) Patent No.: US 12,592,880 B2
(45) Date of Patent: Mar. 31, 2026

(54) PATH IDENTITY ALLOCATION METHOD, SYSTEM, AND APPARATUS, DEVICE, AND STORAGE MEDIUM

(71) Applicant: Huawei Technologies Co., Ltd., Shenzhen (CN)

(72) Inventors: Kaiqiang Shen, Beijing (CN); Yangyang Jia, Shenzhen (CN); Sheng Fang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 363 days.

(21) Appl. No.: 18/185,818

(22) Filed: Mar. 17, 2023

(65) Prior Publication Data

US 2023/0224241 A1 Jul. 13, 2023

Related U.S. Application Data

(63) Continuation of application No. PCT/CN2021/110662, filed on Aug. 4, 2021.

(30) Foreign Application Priority Data

Sep. 19, 2020 (CN) .......................... 202010990879.4
Dec. 23, 2020 (CN) .......................... 202011545932.6

(51) Int. Cl.
*H04L 45/00* (2022.01)
*H04L 45/28* (2022.01)
*H04L 45/50* (2022.01)

(52) U.S. Cl.
CPC .............. *H04L 45/26* (2013.01); *H04L 45/22* (2013.01); *H04L 45/28* (2013.01); *H04L 45/507* (2013.01)

(58) Field of Classification Search
None
See application file for complete search history.

(56) References Cited

U.S. PATENT DOCUMENTS

| | | | | |
|---|---|---|---|---|
| 8,885,463 B1 * | 11/2014 | Medved | .................. | H04L 45/50 |
| | | | | 709/224 |
| 11,621,913 B2 * | 4/2023 | Dutta | ...................... | H04L 45/34 |
| | | | | 370/392 |

(Continued)

FOREIGN PATENT DOCUMENTS

JP 2020526989 A 8/2020

OTHER PUBLICATIONS

S. Sivabalan et al, "Carrying Binding Label/Segment-ID in PCE-based Networks, draft-letf-pce-binding-label-SID-02", PCE Working Group, Mar. 9, 2020, total 13 pages.

(Continued)

*Primary Examiner* — Xavier S Wong
(74) *Attorney, Agent, or Firm* — Slater Matsil, LLP

(57) ABSTRACT

A path identity allocation method, system, and apparatus, a device, and a storage medium are provided, and belong to the field of communication technologies. According to the method, a forwarding node on a path receives a PCEP packet, so that when determining that path identification information of the path is unavailable, the forwarding node performs, based on indication information in the PCEP packet, an operation associated with the path identification information, for example, determines, based on indicated content, that the forwarding node reallocates a path identity, or requests the control node to reallocate a path identity.

30 Claims, 8 Drawing Sheets

Ver: version
flags: flags
message-type: message type
message-length: message length
object-class: object class
OT: object type
Res: reserved
P: processing-rule flag
I: ignore flag
object length: object length
bytes: byte PLSP-ID: PCEP specific identifier for the LSP
O: operational bit
A: administrative bit
R: romove bit
S: state synchronization flag bit
D: delegate flag bit
BT: binding type
F: indication message
binding value: binding value
variable length: variable length

(56) References Cited

U.S. PATENT DOCUMENTS

| | | | | | |
|---|---|---|---|---|---|
| 2001/0007557 | A1* | 7/2001 | Yamada | .................. | H04L 45/00 |
| | | | | | 370/389 |
| 2017/0064717 | A1* | 3/2017 | Filsfils | .................... | H04L 45/50 |
| 2021/0029033 | A1* | 1/2021 | Chen | ........................ | H04L 45/28 |
| 2022/0086078 | A1* | 3/2022 | Sivabalan | ............... | H04L 45/34 |
| 2022/0131791 | A1* | 4/2022 | Du | ........................ | H04L 69/325 |
| 2022/0255862 | A1* | 8/2022 | Wu | ......................... | H04L 45/50 |

OTHER PUBLICATIONS

S. Previdi et al, "Advertising Segment Routing Policies in BGP draft-ietf-idr-segment-routing-te-policy-09", Network Working Group, May 28, 2020, total 39 pages.
C. Flisfils et al, "Segment Routing Policy Architecture draft-letf-spring-segment-routing-policy-08", Spring Working Group, Jul. 7, 2020, total 35 pages.
S. Sivabalan et al: "Carrying Binding Label/Segment-ID in PCE-based Networks, draft-sivabalan-pce-binding-label-sid-07", Jul. 8, 2019 (Jul. 8, 2019), pp. 1-16, XP015134209.
Filsfils S Sivabalan C:"Segment Routing Policy Architecture; draft-letf-spring segment-routing-policy-06.txt" Jun. 16, 2020, total 35 pages.

* cited by examiner

Control node 1021

Forwarding node 1011

Control network 102

PCEP packet

BSID 10012

BGP-LS routing

A          B          C          D

BSID 10011

E          F          G          H

Forwarding network 101

PCEP: Path computation element communication protocol
BGP-LS: Border gateway protocol-link state

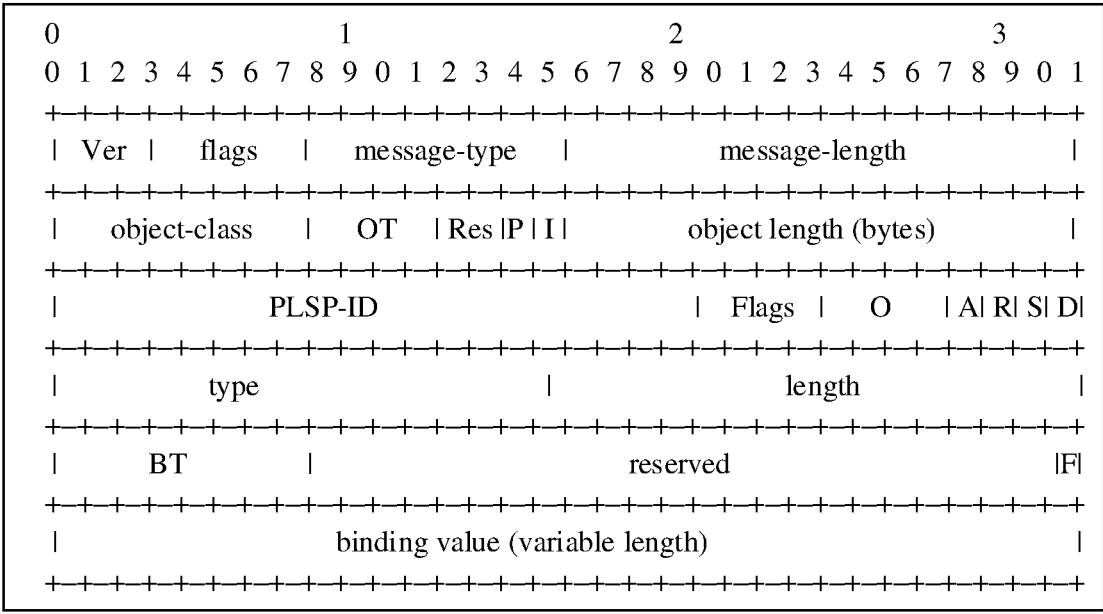

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver |  flags  |  message-type   |          message-length        |
+-+-+-+-+-+-+-+-+-+-+-+-+-+-+-+-+-+-+-+-+-+-+-+-+-+-+-+-+-+-+-+-+
|   object-class  |   OT   | Res |P | I |       object length (bytes)    |
+-+-+-+-+-+-+-+-+-+-+-+-+-+-+-+-+-+-+-+-+-+-+-+-+-+-+-+-+-+-+-+-+
|              PLSP-ID               | Flags |   O    | A| R| S| D|
+-+-+-+-+-+-+-+-+-+-+-+-+-+-+-+-+-+-+-+-+-+-+-+-+-+-+-+-+-+-+-+-+
|         type            |                length                 |
+-+-+-+-+-+-+-+-+-+-+-+-+-+-+-+-+-+-+-+-+-+-+-+-+-+-+-+-+-+-+-+-+
|    BT      |                reserved                          |F|
+-+-+-+-+-+-+-+-+-+-+-+-+-+-+-+-+-+-+-+-+-+-+-+-+-+-+-+-+-+-+-+-+
|                 binding value (variable length)                 |
+-+-+-+-+-+-+-+-+-+-+-+-+-+-+-+-+-+-+-+-+-+-+-+-+-+-+-+-+-+-+-+-+
```

Ver: version
flags: flags
message-type: message type
message-length: message length
object-class: object class
OT: object type
Res: reserved
P: processing-rule flag
I: ignore flag
object length: object length
bytes: byte PLSP-ID: PCEP specific identifier for the LSP
O: operational bit
A: administrative bit
R: romove bit
S: state synchronization flag bit
D: delegate flag bit
BT: binding type
F: indication message
binding value: binding value
variable length: variable length

FIG. 2

```
0                   1                   2                   3
0 1 2 3 4 5 6 7 8 9 0 1 2 3 4 5 6 7 8 9 0 1 2 3 4 5 6 7 8 9 0 1
+—+—+—+—+—+—+—+—+—+—+—+—+—+—+—+—+—+—+—+—+—+—+—+—+—+—+—+—+—+—+—+—+
|             type              |            length             |
+—+—+—+—+—+—+—+—+—+—+—+—+—+—+—+—+—+—+—+—+—+—+—+—+—+—+—+—+—+—+—+—+
|     BT     |               reserved                        |1|
+—+—+—+—+—+—+—+—+—+—+—+—+—+—+—+—+—+—+—+—+—+—+—+—+—+—+—+—+—+—+—+—+
|                             1001                              |
+—+—+—+—+—+—+—+—+—+—+—+—+—+—+—+—+—+—+—+—+—+—+—+—+—+—+—+—+—+—+—+—+
```

1000

PATH IDENTITY ALLOCATION METHOD, SYSTEM, AND APPARATUS, DEVICE, AND STORAGE MEDIUM

CROSS-REFERENCE TO RELATED APPLICATIONS

This application is a continuation of International Application No. PCT/CN2021/110662, filed on Aug. 4, 2021, which claims priority to Chinese Patent Application No. 202010990879.4, filed on Sep. 19, 2020, and Chinese Patent Application No. 202011545932.6, filed on Dec. 23, 2020. All of the aforementioned patent applications are hereby incorporated by reference in their entireties.

TECHNICAL FIELD

This application relates to the field of communication technologies, and in particular, to a path identity allocation method, system, and apparatus, a device, and a storage medium.

BACKGROUND

The segment routing policy (SR Policy) is a new tunneling technology developed based on the SR technology. The SR policy indicates at least one candidate path. Each candidate path has a preference value. A higher preference value of a candidate path indicates a higher preference. A valid candidate path with a highest preference value is an active candidate path. Each candidate path is identified by a segment list. The segment list is also referred to as a segment identity (SID) list. Each candidate path further has a binding segment identity (binding-SID, BSID) attribute, and the BSID of each candidate path is identification information of the candidate path. A BSID of the active candidate path is identification information of the SR policy. That is, the BSID of the active candidate path is a BSID of the SR policy. The BSID plays an important role in traffic diversion of the SR policy. For example, after a head node of the at least one candidate path receives a packet, if the packet carries the BSID of the SR policy, the head node pops out the BSID in the packet, and pushes, into a header of the packet, a SID list of an active candidate path in the SR policy as a label stack, to guide the packet to be forwarded on the active candidate path. The candidate path for forwarding the packet based on the label stack is also referred to as a label switching path (ISP).

Currently, there are many types of SR policies, and different types of SR policies are created in different manners. For example, the segment routing over internet protocol version 6 (IPv6) policy (SRv6 Policy) is created in various manners, for example, is created according to the path computation element communication protocol (PCEP), is created according to the border gateway protocol (BGP), or is statically configured.

During creation of the SRv6 policy, a path identity (for example, a BSID) is usually allocated to the SRv6 policy. For example, the SRv6 policy is created according to PCEP. A path computation element (PCE) sends a path computation ISP initiate (PCInitiate) packet to a path computation client (CC) according to PCEP. The PCC is a head node of a candidate path indicated by the SRv6 policy in a network, and the PCInitiate packet carries a BSID of the candidate path indicated by the SRv6 policy. However, in some possible scenarios, after receiving the BSID sent by the PCE, the PCC may find that the BSID cannot be normally used and therefore fails to be allocated. In this case, the PCC can only request the PCE to allocate a new BSID. Therefore, when the PCE fails to allocate a BSID to the path, the PCC can only request the PCE to allocate a new BSID, resulting in inflexible allocation of path identities.

SUMMARY

Embodiments of this application provide a path identity allocation method, system, and apparatus, a device, and a storage medium, to improve path identity allocation efficiency. The technical solution is as follows.

According to a first aspect, a path identity allocation method is provided. The method is performed by a forwarding node on a path, and the method includes: receiving a path computation element protocol PCEP packet, where the PCEP packet includes path identification information used to identify the path and indication information associated with the path identification information; and determining that the path identification information is unavailable, and performing, based on the indication information, an operation associated with the path identification information.

The unavailability of the path identification information may be represented as unavailability due to a conflict, or unavailability due to a failure to verification. In some cases, if the path identification information is already occupied by another path other than the path, the path identification information of the path conflicts with path identification information of the another path, and the path identification information of the path is unavailable. In some other cases, the forwarding node performs verification on the path identification information of the path, and if the verification on the path identification information fails, the path identification information is unavailable. For example, if the path identification information does not belong to a path identification information range used when the forwarding node configures path identification information for the path, the verification on the path identification information fails. For another example, if the path identification information does not conform to a preset data format of path identification information, the verification on the path identification information fails.

In this method, the forwarding node on the path receives the PCEP packet, so that when determining that the path identification information of the path is unavailable, the forwarding node performs, based on the indication information in the PCEP packet, the operation associated with the path identification information, for example, determines, based on indicated content, that the forwarding node reallocates a path identity, or requests a control node to reallocate a path identity. This improves path identity allocation flexibility and efficiency.

Optionally, if the indication information is first indication information, the operation associated with the path identification information is a first operation, and the first operation includes reallocating path identification information to the path.

Based on the foregoing optional implementation, the first indication information explicitly indicates the forwarding node to reallocate the path identification information to the path when it is determined that the path identity of the path is unavailable, and the forwarding node does not need to request the control node to reallocate path identification information. This reduces a quantity of interactions between the control node and the forwarding node, and improves path identity allocation efficiency.

Optionally, after the performing, based on the indication information, an operation associated with the path identification information, the method further includes: sending an identity update packet to a control node, where the identity update packet indicates to update the path identification information to target path identification information, and the target path identification information is path identification information reallocated by the forwarding node to the path.

Based on the foregoing optional implementation, the forwarding node sends the identity update packet to the control node, so that the control node updates the stored path identification information of the path to the target path identification information, to ensure that the path identification information of the path is consistent between the control node and the forwarding node, and avoid a case in which the forwarding node cannot normally forward a data flow due to inconsistent path identification information.

Optionally, the identity update packet is a path computation state report (PCRpt) packet.

Optionally, the identity update packet includes the target path identification information. In some embodiments, the identity update packet further includes an update identifier, and the update identifier indicates to update the path identification information to the target path identification information.

Based on the foregoing optional implementation, a plurality of identity update packets are provided, to meet a requirement of each application scenario for the identity update packet.

Optionally, if the indication information is second indication information, the operation associated with the path identification information includes a second operation, the second operation includes sending a message to a control node, and the message indicates that an error occurs during allocation of the path identification information of the path.

Based on the foregoing optional implementation, the second indication information explicitly indicates the forwarding node to report, to the control node when the forwarding node determines that the path identity of the path is unavailable, that an error occurs during allocation of the path identification information of the path, so that the control node allocates new path identification information to the path, thereby helping the control node maintain path identification information of all paths in a forwarding network.

Optionally, the path identification information includes a BSID of the path.

Optionally, the indication information is located in a reserved reserved field in a BSID field in the PCEP packet.

Optionally, the indication information is located in a flags flags field in the PCEP packet.

Optionally, the indication information occupies at least one bit.

Optionally, the PCEP packet includes any one of a PCInitiate packet or a path computation update request (path computation update request, PCUpd) packet.

Optionally, the path is a path indicated by an SR policy, and the SR policy includes any one of a segment routing traffic engineering policy (SR TE Policy) or an SRv6 policy.

Optionally, the path is a candidate path.

Optionally, the path identification information is identification information of the SR policy or identification information of the candidate path.

Optionally, the determining that the path identification information is unavailable includes:

if the path identification information is already occupied by any path other than the path, determining that the path identification information is unavailable.

Optionally, the forwarding node is a head node of the path.

According to a second aspect, a path identity allocation method is provided. The method is performed by a control node, and the method includes: generating a PCEP packet, and sending the PCEP packet to a forwarding node on a path, where the PCEP packet includes path identification information used to identify the path and indication information associated with the path identification information, and the indication information indicates a forwarding node on the path to perform, based on the indication information when the forwarding node determines that the path identification information is unavailable, an operation associated with the path identification information.

Optionally, if the indication information is first indication information, the operation associated with the path identification information is a first operation, and the first operation includes reallocating path identification information to the path.

Optionally, if the indication information is second indication information, the operation associated with the path identification information is a second operation, the second operation includes sending a message to a control node, and the message indicates that an error occurs during allocation of the path identification information of the path.

If the indication information is second indication information, the operation associated with the path identification information includes a second operation, the second operation includes sending a message to a control node, and the message indicates that an error occurs during allocation of the path identification information of the path.

Optionally, the path identification information includes a BSID of the path.

Optionally, the indication information is located in a reserved field in a BSID field in the PCEP packet.

Optionally, the indication information is located in a flags field in the PCEP packet.

Optionally, the indication information occupies at least one bit.

Optionally, the PCEP packet includes any one of a PCInitiate packet or a PCUpd packet.

Optionally, the path is a path indicated by an SR policy, and the SR policy includes any one of an SR TE policy or an SRv6 policy.

Optionally, the path is a candidate path.

Optionally, the path identification information is identification information of the SR policy or identification information of the candidate path.

Optionally, the forwarding node is a head node of the path.

Optionally, the generating a PCEP packet includes: if it is detected that the forwarding node restarts due to a fault, generating the PCEP packet.

Optionally, after the sending the PCEP packet to the forwarding node, the method further includes: receiving a message, where the message indicates that an error occurs during allocation of the path identification information of the path; and reallocating path identification information to the path based on the message.

Optionally, after the sending the PCEP packet to the forwarding node, the method further includes: receiving an identity update packet, where the identity update packet indicates to update the path identification information to target path identification information, and the target path identification information is path identification information reallocated by the forwarding node to the path; and updating the stored path identification information of the path to the target path identification information based on the identity update packet.

Optionally, the identity update packet is a PCRpt packet.

Optionally, the identity update packet includes the target path identification information. In some embodiments, the identity update packet further includes an update identifier, and the update identifier indicates to update the path identification information to the target path identification information.

According to a third aspect, a path identity allocation system is provided. The path identity allocation system includes a control node and a forwarding node.

The control node is configured to: generate a PCEP packet, where the PCEP packet includes path identification information used to identify a path and indication information associated with the path identification information; and send the PCEP packet to a forwarding node on the path.

The forwarding node is configured to receive the PCEP packet, determine that the path identification information is unavailable, and perform, based on the indication information, an operation associated with the path identification information.

Optionally, if the indication information is first indication information, the operation associated with the path identification information is a first operation, and the first operation includes reallocating path identification information to the path.

Optionally, if the indication information is first indication information, the operation associated with the path identification information is a second operation, the second operation includes sending a message to a control node, and the message indicates that an error occurs during allocation of the path identification information of the path.

If the indication information is second indication information, the operation associated with the path identification information includes a second operation, the second operation includes sending a message to a control node, and the message indicates that an error occurs during allocation of the path identification information of the path.

Optionally, the path identification information includes a BSID of the path.

Optionally, the indication information is located in a reserved field in a BSID field in the PCEP packet.

Optionally, the indication information is located in a flags field in the PCEP packet.

Optionally, the indication information occupies at least one bit.

Optionally, the PCEP packet includes any one of a PCInitiate packet or a PCUpd packet.

Optionally, the path is a path indicated by an SR policy, and the SR policy includes any one of an SR TE policy or an SRv6 policy.

Optionally, the path is a candidate path.

Optionally, the path identification information is identification information of the SR policy or identification information of the candidate path.

Optionally, the forwarding node is a head node of the path.

Optionally, the forwarding node is further configured to send an identity update packet to the control node, where the identity update packet indicates to update the path identification information to target path identification information, and the target path identification information is path identification information reallocated by the forwarding node to the path.

The control node is further configured to: receive the identity update packet, and update the stored path identification information of the path to the target path identification information based on the identity update packet.

Optionally, the identity update packet is a PCRpt packet.

Optionally, the identity update packet includes the target path identification information. In some embodiments, the identity update packet further includes an update identifier, and the update identifier indicates to update the path identification information to the target path identification information.

Optionally, the forwarding node is further configured to: if the path identification information is already occupied by any path other than the path, determine that the path identification information is unavailable.

Optionally, the forwarding node is further configured to send a message to the control node, where the message indicates that an error occurs during allocation of the path identification information of the path.

The control node is further configured to receive the message, and reallocate path identification information to the path based on the message.

Optionally, the control node is further configured to: if it is detected that the forwarding node restarts due to a fault, generate the PCEP packet.

According to a fourth aspect, a path identity allocation apparatus is provided. The apparatus is configured as a forwarding node on a path, and the apparatus includes: a receiving module, configured to receive a path computation element protocol PCEP packet, where the PCEP packet includes path identification information used to identify the path and indication information associated with the path identification information; a determining module, configured to determine that the path identification information is unavailable; and an execution module, configured to perform, based on the indication information, an operation associated with the path identification information.

Optionally, if the indication information is first indication information, the operation associated with the path identification information is a first operation, and the first operation includes reallocating path identification information to the path.

Optionally, if the indication information is first indication information, the operation associated with the path identification information is a second operation, the second operation includes sending a message to a control node, and the message indicates that an error occurs during allocation of the path identification information of the path.

Optionally, the execution module includes: a sending unit, configured to send an identity update packet to the control node, where the identity update packet indicates to update the path identification information to target path identification information, and the target path identification information is path identification information reallocated by the forwarding node to the path.

Optionally, the identity update packet is a PCRpt packet.

Optionally, the identity update packet includes the target path identification information. In some embodiments, the identity update packet further includes an update identifier, and the update identifier indicates to update the path identification information to the target path identification information.

Optionally, if the indication information is second indication information, the operation associated with the path identification information includes a second operation, the second operation includes sending a message to a control node, and the message indicates that an error occurs during allocation of the path identification information of the path.

Optionally, the path identification information includes a BSID of the path.

Optionally, the indication information is located in a reserved field in a BSID field in the PCEP packet.

Optionally, the indication information is located in a flags field in the PCEP packet.

Optionally, the indication information occupies at least one bit.

Optionally, the PCEP packet includes any one of a PCInitiate packet or a PCUpd packet.

Optionally, the path is a path indicated by an SR policy, and the SR policy includes any one of an SR TE policy or an SRv6 policy.

Optionally, the path is a candidate path.

Optionally, the path identification information is identification information of the SR policy or identification information of the candidate path.

Optionally, the forwarding node is a head node of the path.

According to a fifth aspect, a path identity allocation apparatus is provided. The apparatus is configured as a control node, and the apparatus includes: a generation module, configured to generate a PCEP packet, where the PCEP packet includes path identification information used to identify a path and indication information associated with the path identification information, and the indication information indicates a forwarding node on the path to perform, based on the indication information when the forwarding node determines that the path identification information is unavailable, an operation associated with the path identification information; and a sending module, configured to send the PCEP packet to the forwarding node.

Optionally, if the indication information is first indication information, the operation associated with the path identification information is a first operation, and the first operation includes reallocating path identification information to the path.

Optionally, if the indication information is first indication information, the operation associated with the path identification information is a second operation, the second operation includes sending a message to a control node, and the message indicates that an error occurs during allocation of the path identification information of the path.

If the indication information is second indication information, the operation associated with the path identification information includes a second operation, the second operation includes sending a message to a control node, and the message indicates that an error occurs during allocation of the path identification information of the path.

Optionally, the path identification information includes a BSID of the path.

Optionally, the indication information is located in a reserved field in a BSID field in the PCEP packet.

Optionally, the indication information is located in a flags field in the PCEP packet.

Optionally, the indication information occupies at least one bit.

Optionally, the PCEP packet includes any one of a PCInitiate packet or a PCUpd packet.

Optionally, the path is a path indicated by an SR policy, and the SR policy includes any one of an SR TE policy or an SRv6 policy.

Optionally, the path is a candidate path.

Optionally, the path identification information is identification information of the SR policy or identification information of the candidate path.

Optionally, the forwarding node is a head node of the path.

Optionally, the generation module is configured to: if it is detected that the forwarding node restarts due to a fault, generate the PCEP packet.

Optionally, the apparatus further includes: a first receiving module, configured to receive a message, where the message indicates that an error occurs during allocation of the path identification information of the path; and an allocation module, configured to reallocate path identification information to the path based on the message.

Optionally, the apparatus further includes: a second receiving module, configured to receive an identity update packet, where the identity update packet indicates to update the path identification information to target path identification information, and the target path identification information is path identification information reallocated by the forwarding node to the path; and an update module, configured to update the stored path identification information of the path to the target path identification information based on the identity update packet.

Optionally, the identity update packet is a PCRpt packet.

Optionally, the identity update packet includes the target path identification information. In some embodiments, the identity update packet further includes an update identifier, and the update identifier indicates to update the path identification information to the target path identification information.

According to a sixth aspect, a network device is provided. The network device includes a processor, and the processor invokes program instructions, so that the network device implements an operation performed in the path identity allocation method provided in any one of the first aspect and the optional implementations of the first aspect. The network device may further include a memory. The memory is coupled to the processor, and the program instructions invoked by the processor are stored in the memory. The network device may further include a communication interface. The communication interface is used by the device to communicate with another device. For example, the communication interface may be a transceiver, a circuit, a bus, a module, or a communication interface of another type. The program instructions invoked by the processor may alternatively be prestored in an external memory, and are downloaded from the internet before being used and then stored locally. A source of the instructions in the memory is not uniquely limited in this application.

According to a seventh aspect, a control device is provided. The control device includes a processor, and the processor invokes program instructions, so that the control device implements an operation performed in the path identity allocation method provided in any one of the second aspect or the optional implementations of the second aspect. The control device may further include a memory. The memory is coupled to the processor, and the program instructions invoked by the processor are stored in the memory. The control device may further include a communication interface. The communication interface is used by the device to communicate with another device. For example, the communication interface may be a transceiver, a circuit, a bus, a module, or a communication interface of another type. The program instructions invoked by the processor may alternatively be prestored in an external memory, and are downloaded from the internet before being used and then stored locally. A source of the instructions in the memory is not uniquely limited in this application.

According to an eighth aspect, a computer-readable storage medium is provided. The storage medium stores program code, and the program code is loaded and executed by a processor, so that a network device implements an operation performed in the path identity allocation method according to any one of the first aspect or the optional implementations of the first aspect.

According to a ninth aspect, a computer-readable storage medium is provided. The storage medium stores program code, and the program code is loaded and executed by a processor, so that a control device implements an operation performed in the path identity allocation method according to any one of the second aspect or the optional implementations of the second aspect.

According to a tenth aspect, a computer program product or a computer program is provided. The computer program product or the computer program includes program code. When the program code is run on a network device, the network device is enabled to perform the method according to the first aspect or the optional implementations of the first aspect.

According to an eleventh aspect, a computer program product or a computer program is provided. The computer program product or the computer program includes program code. When the program code is run on a control device, the control device is enabled to perform the method according to the second aspect or the optional implementations of the second aspect.

The path identity allocation method according to any one of the first aspect or the optional implementations of the first aspect may be performed by a peer device of the device that performs the path identity allocation method provided in any one of the second aspect or the optional implementations of the second aspect. The solutions provided in the third aspect to the eleventh aspect can be used to implement the path identity allocation method provided in any one of the first aspect or the optional implementations of the first aspect, or the path identity allocation method provided in any one of the second aspect or the optional implementations of the second aspect. Therefore, a same beneficial effect can be achieved as that of the first aspect or the optional implementation of the first aspect. Details are not described herein again.

BRIEF DESCRIPTION OF THE DRAWINGS

To describe the technical solutions in embodiments of this application more clearly, the following briefly describes the accompanying drawings for describing embodiments. It is clear that the accompanying drawings in the following description show merely some embodiments of this application, and a person of ordinary skill in the art may still derive other drawings from these accompanying drawings without creative efforts.

FIG. 2 is a schematic diagram of a packet format of a PCEP packet according to an embodiment of this application;

DETAILED DESCRIPTION OF ILLUSTRATIVE EMBODIMENTS

Figure 1:
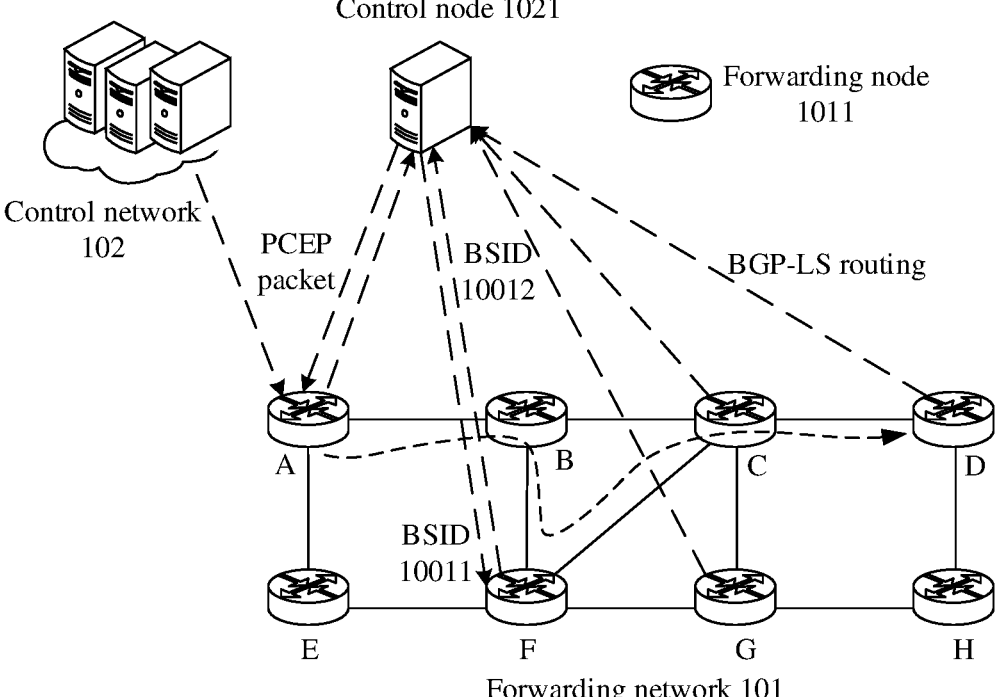
FIG. 1 is a schematic diagram of a path identity allocation system according to an embodiment of this application.

To make the objectives, technical solutions, and advantages of this application clearer, the following further describes the implementations of this application in detail with reference to the accompanying drawings.

This application provides a PCEP packet. The PCEP packet includes path identification information used to identify a path and indication information associated with the path identification information, so that a forwarding node on the path performs, based on the indication information when the forwarding node determines that the path identification information is unavailable, an operation associated with the path identification information. In different application scenarios, different indication information indicates different operations associated with the path identification information, so that the path identity is allocated flexibly. The following application scenarios 1 to 3 are used as examples.

Application scenario 1: In some embodiments, to allocate and manage path identification information of all paths in an entire network, when allocating path identification information to a path, a control node may generate a PCEP packet that includes path identification information of the path and second indication information. When the control node sends the PCEP packet to a forwarding node on the path, the forwarding node determines, based on the second indication information, that the path identification information allocated by the control node to the path is unavailable, and sends a message to the control node to report an error, so as to request the control node to reallocate path identification information to the path. For example, in this case, the forwarding node may return a path computation error (PCEP error, PCErr) message to the control node according to the PCEP protocol, to indicate that an error occurs in the path identification information allocated by the control node to the path. After receiving the PCErr message, the control node continues to allocate new path identification information to the path, and delivers the newly allocated path identification information to the forwarding node until the newly delivered path identification information can be normally used.

Application scenario 2: In some embodiments, to avoid a case in which a control node reallocates path identification information because path identification information allocated by the control node to a path is unavailable, when allocating path identification information to the path, the control node may generate a PCEP packet that includes the path identification information of the path and first indication information. When the control node sends the PCEP packet to a forwarding node on the path, when the forwarding node determines that the path identification information allocated by the control node to the path is unavailable, the forwarding node reallocates path identification information to the path based on the first indication information, and does not need to request the control node to reallocate path identification information to the path. Therefore, interactions between the forwarding node and the control node are reduced, and path identity allocation efficiency is improved. In addition, in this case, after the forwarding node reallocates the path identification information to the path, the forwarding node may further send, to the control node, the path identification information allocated by the forwarding node to the path, and then the control node updates and stores the path identification information. Therefore, even if the forwarding node can allocate the path identification information to the path, the control node can still learn of available path identification information of each path in the network, to facilitate unified management by the control node.

Application scenario 3: In some embodiments, in a scenario in which a forwarding node restarts due to a fault, a control node may also notify the forwarding node of path identification information of a path by using a PCEP packet. In a possible implementation, the control node may further detect an online status of the forwarding node in real time. If the control node detects, within target duration, that the forwarding node is in an offline state, the control node determines that the forwarding node is faulty. If the control node subsequently detects that the forwarding node is in an online state, the control node determines that the forwarding node restarts due to a fault. After the control node determines that the forwarding node restarts due to a fault, to avoid loss of the locally stored path identification information of the path in the forwarding node due to the fault, the control node notifies the forwarding node of the path identification information of the path again by using the PCEP packet. The path identification information of the path in the PCEP packet may be path identification information used by the forwarding node before the fault. However, the forwarding node may serve a plurality of services. After the forwarding node restarts due to a fault, to continue to serve the plurality of services, the forwarding node may need to restore path identification information of paths corresponding to the plurality of services. Because a time sequence in which the forwarding node restores the path identification information of the paths corresponding to the plurality of services is uncontrollable, when receiving path identification information re-delivered by the control node, the forwarding node may find that the path identification information is unavailable because the path identification information has been allocated to another service. In this case, the forwarding node may reallocate path identification information to the path based on first indication information in the PCEP packet, and notify the control node of the path identification information, so that the control node updates locally stored path identification information of the path. It should be noted that, after the control node determines that the forwarding node restarts due to a fault, the path identification information of the path in the PCEP packet that is re-sent to the forwarding node may be path identification information that is locally stored in the control node and that is used by the path before the forwarding node is faulty, or may be path identification information reallocated by the control node to the path.

To further describe a process of using the PCEP packet in various application scenarios, the following provides detailed descriptions with reference to specific embodiments.

FIG. 1 is a schematic diagram of a path identity allocation system according to an embodiment of this application. Refer to FIG. 1. The system 100 includes a forwarding network 101 and a control network 102. The forwarding network 101 includes a plurality of forwarding nodes 1011 (for example, forwarding nodes A to H in FIG. 1). The plurality of forwarding nodes 1011 may form a plurality of paths, and each path is formed by some of the plurality of forwarding nodes 1011. The plurality of paths may also have a same forwarding node 1011. For example, a path 1 in FIG. 1 includes forwarding nodes A, B, F, C, and D, and a path 2 includes forwarding nodes F, C, and D. The forwarding nodes F, C, and D are same forwarding nodes on the path 1 and the path 2.

Forwarding nodes 1011 on any path in the forwarding network 101 may be classified into a head node, an intermediate node, and a tail node based on locations of forwarding nodes 1011 on the path. The head node is the first forwarding node on the path, the intermediate node is a forwarding node other than the first forwarding node and the last forwarding node on the path, and the tail node is the last forwarding node on the path. The path may be a part of an end-to-end packet forwarding path, for example, may be a tunnel.

The control network 102 is configured to send a control message to each forwarding node 1011 in the forwarding network 101, so that each forwarding node 1011 performs a corresponding operation based on the control message. The control network 102 includes a control node 1021. In an initialization phase, the control node 1021 may collect topology information of the forwarding network 101. In a possible implementation, the control node 1021 collects the topology information of the forwarding network 101 according to the border gateway protocol (border gateway protocol, BGP)-link state (link-state, LS) protocol. The BGP-LS protocol is a BGP multiprotocol extension for transferring an interior gateway protocol (interior gateway protocol, IGP)-link state according to the BGP protocol. In a possible implementation, the forwarding network 101 includes a plurality of IGP areas. A forwarding node 1011 that has a BGP-LS neighbor relationship with a control node 1021 in any IGP area collects topology information of the IGP area according to the IGP protocol, encapsulates the collected topology information into a BGP-LS route, and sends the BGP-LS route to the control node 1021. In this way, the control node 1021 can obtain topology information of the IGP areas in the forwarding network 101, and the control node 1021 obtains the topology information of the forwarding network 101 by integrating the topology information of the IGP areas. For example, after collecting topology information of IGP areas including the forwarding nodes G, C, and D in FIG. 1, the forwarding nodes G, C, and D report the topology information of the IGP areas including the forwarding nodes G, C, and D to the control node 1021 by sending BGP-1S routes to the control node 1021.

Before the forwarding network 101 forwards a data flow of any service served by the forwarding network 101, the control node 1021 may determine, in the forwarding network 101 based on a transmission requirement of the data flow, a forwarding node used to receive the data flow and a forwarding node used to output the data flow, and allocate at least one candidate path to the data flow based on locations of the two forwarding nodes in the forwarding network 101. A head node of each candidate path is a determined forwarding node used to receive the data flow, and a tail node of each candidate path is a determined forwarding node used to output the data flow. The control node 1021 may further generate an SR policy based on the at least one candidate path, and deliver the SR policy to a head node of the at least one candidate path. The SR policy indicates at least one candidate path used to forward the data flow.

In addition to sending the SR policy to the head node of the at least one candidate path, the control node 1021 may further allocate path identification information (for example, a BSID) to each of the at least one candidate path. In a possible implementation, for any one of the at least one candidate path, the control node 1021 notifies, by using a PCEP packet, the head node of path identification information allocated by the control node 1021 to the candidate path. The PCEP packet includes the path identification information used to identify the candidate path and indication information associated with the path identification information.

After receiving the PCEP packet, the head node determines whether the path identification information of the candidate path in the PCEP packet is occupied by another path. If the path identification information of the candidate path is occupied by another path, the path identification information of the candidate path is unavailable. If the path identification information of the candidate path is unavailable, the head node performs, based on the indication information associated with the path identification information in the PCEP packet, an operation associated with the path identification information. The operation may be that the head node reallocates path identification information to the candidate path, or may be that the head node sends a message to the control node 1021 to indicate that an error occurs during allocation of the path identification information of the candidate path, and then the control node reallocates path identification information to the candidate path.

It should be noted that, if the head node reallocates the path identification information to the candidate path, after the head node allocates the path identification information to the candidate path, the head node sends, to the control node 1021, the path identification information allocated by the head node to the candidate path, and the control node 1021 stores the path identification information.

For example, the control node 1021 sends a PCEP packet to the forwarding node A (head node) on the path 1 in FIG. 1, to notify the forwarding node A of path identification information allocated by the control node 1021 to the path 1. If the forwarding node A determines that the path identification information allocated by the control node 1021 to the path 1 is unavailable, the forwarding node A allocates new path identification information to the path 1 based on indication information associated with the path identification information in the PCEP packet, and sends the new path identification information to the control node 1021. The control node 1021 stores the new path identification information.

For example, the path identification information is a BSID. If a BSID allocated by the control node 1021 to the path 2 in FIG. 1 is 10011, the control node sends a PCEP packet to the forwarding node F (head node) on the path 2. The PCEP packet carries 10011 allocated by the control node 1021 to the path 2 and indication information associated with 10011. If the forwarding node F determines that 10011 is already occupied by a path other than the path 2, the forwarding node F allocates a new BSID to the path 2 based on the indication information associated with 10011 in the PCEP packet. The new BSID is 10012. The forwarding node F sends, to the control node 1021, 10012 allocated by the forwarding node F to the path 2, and the control node stores the BSID of the path 2 as 10012.

After determining that the stored path identification information of each candidate path in the SR policy is available, the control node 1021 sends path identification information of an active candidate path in the SR policy as identification information of the SR policy to a transmitting end of the data flow of the service, for example, a tunnel head node corresponding to the SR policy. The transmitting end adds the path identification information of the SR policy to a packet in the data flow. After receiving the packet in the data flow, the head node pops out the path identification information carried in the packet, uses a SID list of the candidate path identified by the path identification information as a label stack, and pushes the SID list into a header of the packet, to guide the packet to be forwarded out of the forwarding network 101 according to the candidate path.

It should be noted that a head node on each path in the forwarding network 101 interacts with the control node 1021 according to the PCEP protocol. In some embodiments, the head node is referred to as a PCC, and the control node 1021 is referred to as a PCE.

In some embodiments, the control network 102 may be considered as a control center, for example, a network cloud engine (network cloud engine). In addition to the control node 1021, the control network 102 may further include a control node having another control function, for example, a control node that sends a specific control message to the head node. The specific control message indicates the head node to forward the data flow of the service according to a candidate path indicated by the SR policy delivered by the control node 1021, or indicates the head node to forward the data flow of the service according to a manually configured path. It may be understood that, if the control network 102 includes a plurality of control devices, the control node 1021 is a control device that is in the control network 102 and that is configured to deliver an SR policy to the control network 102 and allocate path identification information to each candidate path indicated by the SR policy. If the control network 102 is implemented by one control device, the control node 1021 is a control module in the control device.

The PCEP packet in this application includes path identification information used to identify a path and indication information associated with the path identification information. When the path identification information of the path is a BSID, the path identification information may be located in a reserved field in a BSID field in the PCEP packet. The PCEP packet may include at least one PCEP object, for example, an ISP object. Each PCEP object in the PCEP packet may carry at least one type-length-value (TLV). Optionally, a TLV in the ISP object includes a traffic engineering (TE)-path-BSID TLV, and the TE-path-BSID TLV may be considered as the BSID field in the PCEP packet.

FIG. 2 is a schematic diagram of a packet format of a PCEP packet according to an embodiment of this application. The PCEP packet shown in FIG. 2 includes a header and a PCEP object. The header includes a version (Ver) field, a flags field, a message-type field, and a message-length field. The Ver field is used to store a version of PCEP, and occupies 3 bits. The flags field in the header is not currently defined, all bits in the flags field in the header may be set to 0, and the flags field occupies 5 bits. The message-type field is used to store a type identifier of the PCEP packet, and occupies 8 bits. PCEP packets are classified into a PCInitiate packet, a PCUpd packet, and a PCRpt packet. Different type identifiers of the PCEP packets are used to identify different types of PCEP packets. For example, if the type identifier stored in the message-type field is 12, the PCEP packet is the PCInitiate packet; if the type identifier stored in the message type field is 11, the PCEP packet is the PCUpd packet; and if the type identifier stored in the message type field is 10, the PCEP packet is the PCRpt packet.

At least one PCEP object in the PCEP packet has a common format. The at least one PCEP object starts with a common object header, and then an object specific field is defined for different PCEP objects. For example, a common object header in the PCEP packet shown in FIG. 2 includes an object-class field, an object-type (OT) field, a reserved (Res) field, a processing-rule (P) flag field, an ignore (I) flag field, and an object-length field. The object-class field is used to store a class identifier of a PCEP object and occupies 8 bits. The object-type field is used to store a type identifier of an object and occupies 4 bits. Content stored in the object-class field and the object-type field is used to uniquely identify a PCEP object. For example, if the class identifier stored in the object-class field is 32, and the type identifier stored in the object-type field is 1, the PCEP object is an ISP object. The reserved field in the common object header occupies 2 bits, and the 2 bits are reserved bits and may be both set to 0. The P flag field is used to store a P flag and occupies 1 bit. When the P flag is set, the PCEP object needs to be considered. When the P flag is not set, the PCEP object may be ignored. The I flag field is used to store an I flag, and the I flag is used to determine whether the PCEP object is to be processed. The I flag field occupies 1 bit. The object-length field is used to store a length (represented by a quantity of bytes) of the PCEP object, and occupies 16 bits.

As shown in FIG. 2, an object specific field defined for an ISP object includes a PCEP specific identifier for the ISP (PLSP-ID), a flags field, and a TLV field. A PLSP-ID stored in the PLSP-ID field is used to identify an SP in a lifetime of each PCEP session, and the PLSP-ID field occupies 20 bits. The flags field in the ISP object occupies 12 bits in total, including an operational (O) bit with a length of 3 bits, and an administrative (A) bit, a remove (R) bit, a state synchronization (S) flag bit, and a delegate (D) flag bit each with a length of 1 bit, and other bits are set to 0. The A bit is used to identify an operation status of the ISP, the R flag bit indicates to delete the SP from a database, the S flag bit is used to mark ISP state synchronization, and the D flag bit is used to identify that the ISP is in a delegated state. The TLV field shown in FIG. 2 is a TE-path-BSID TLV, including a type field, a length field, a binding type (BT) field, a reserved field, and a binding value field. The type field is used to store a type identifier of the TLV. If the type identifier of the TLV is 1011, the TLV field is a TE-path-BSID TLV. The length field is used to store a length of the TLV field. The BT field is used to store an identifier of a binding type. The second reserved field is a field reserved for extending a TLV function. Indication information associated with path identification information may be stored in the second reserved field. For example, in FIG. 2, the indication information is represented by F, and F is stored in the last bit of the second reserved field. Certainly, F may also be located in any position in the second reserved field. The binding value field is used to store path identification information (for example, a BSID) of a path. BSIDs of different binding types have different lengths. Therefore, a length of the BSID stored in the binding value field is variable.

It should be noted that the PCEP packet format shown in FIG. 2 is not a complete packet format of the PCEP packet. Only some fields are shown in FIG. 2, and other fields of the PCEP packet are not shown in FIG. 2. For example, a header of the PCEP packet may further include other fields. The PCEP packet may include a plurality of PCEP objects, and only an ISP object is shown in FIG. 2. In addition, the ISP shown in FIG. 2 may also correspondingly include TLVs other than the TE-path-BSID TLV, and FIG. 2 shows the data format of only the TE-path-BSID TLV.

In addition, it should be noted that, in the PCEP packet shown in FIG. 2, the indication information associated with the path identification information is located in the reserved field of the TE-path-BSID TLV. In some embodiments, the indication information may alternatively be located in another reserved field in the PCEP packet, for example, the reserved field in the common object header of the PCEP packet. In some embodiments, the indication information may alternatively be located in a flags field in the PCEP packet, for example, the flags field in the ISP object or the flags field in the header of the PCEP packet. In the PCEP packet shown in FIG. 2, the indication information occupies 1 bit. In some embodiments, the path identification information may occupy a plurality of bits. A quantity of bits occupied by the indication information is described with reference to a method embodiment subsequently, and is not described herein by using an example.

Figures 3, 4:
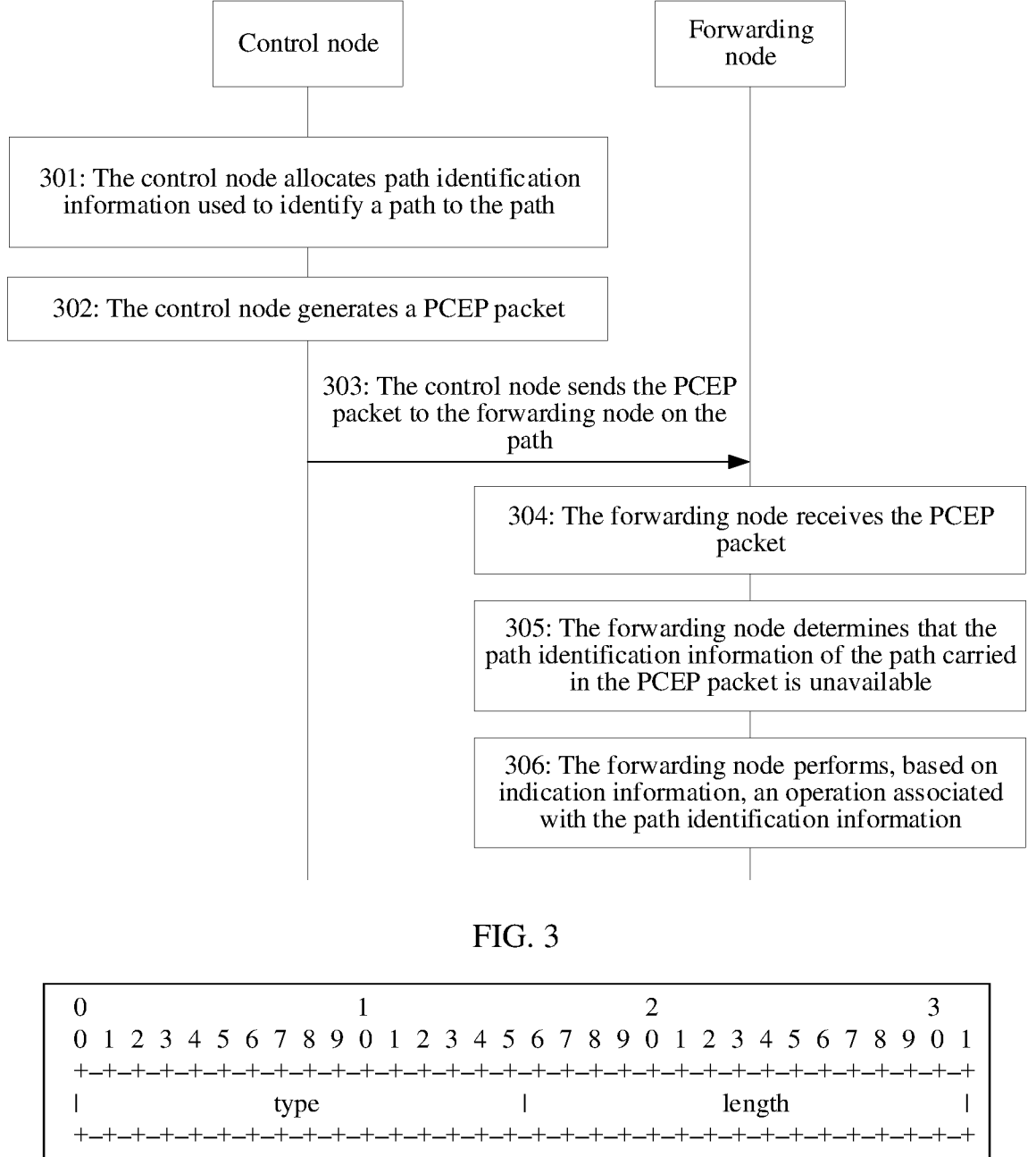
FIG. 3 is a flowchart of a path identity allocation method according to an embodiment of this application.
FIG. 4 is a schematic diagram of a data format of a TE-path-BSID TLV according to an embodiment of this application.

For any path, a control node delivers, to a forwarding node on the path by using a PCEP packet, path identification information allocated by the control node to the path, and the PCEP packet further carries indication information associated with the path identification information, to clearly indicate the forwarding node to perform, based on the indication information when the forwarding node determines that the path identification information is unavailable, an operation associated with the path identification information. To further describe the process, FIG. 3 is a flowchart of a path identity allocation method according to an embodiment of this application.

301: The control node allocates, to a path, path identification information used to identify the path.

The path may be any path in a forwarding network. In a possible implementation, the path is a path indicated by an SR policy. The SR policy may be an SR policy allocated by the control node to any service. Optionally, the SR policy indicates at least one candidate path, and the path is any one of the at least one candidate path. The SR policy may include either a segment routing traffic engineering policy (SR TE policy) or an SRv6 policy. A type of the SR policy is not specifically limited in this embodiment of this application.

The path identification information of the path includes a BSID of the path. In some embodiments, the path identification information of the path may alternatively be other identification information of the path. The other identification information of the path is not specifically limited in this embodiment of this application.

In a possible implementation, a path identity set is set in the control node, the path identity set includes a plurality of pieces of path identification information, and the control node allocates any one of the plurality of pieces of path identification information to the path. For example, the path identification information is a BSID. If the BSID in the path identity set belongs to [0000, 9999], the control node randomly allocates 1000 in the path identity set to the path as the BSID of the path.

In another possible implementation, the control node allocates the path identification information to the path from the plurality of pieces of path identification information according to a preset allocation rule. Optionally, if the plurality of pieces of path identification information are in different magnitudes, the control node allocates path identification information in largest magnitude in the plurality of pieces of path identification information to the path, or the control node allocates path identification information in smallest magnitude in the plurality of pieces of path identification information to the path. In some embodiments, the control node may further delete, from the path identity set, the path identification information allocated to the path, to avoid subsequently allocating the path identification information of the path to a path other than the path when path identification information is allocated to the path other than the path based on the path identity set.

After the control node allocates the path identification information to the path, the control node may further store the path identification information of the path in association with the path. In a possible implementation, when the path is a candidate path in an SR policy, the control node stores path identification information of the path in the SR policy to which the path belongs, and associates existing related information of the path in the SR policy with the path identification information of the path. The existing related information of the path includes at least one of a preference value of the path in the SR policy and a SID list of the path.

It should be noted that, for an SR policy, the control node allocates one piece of path identification information to each candidate path indicated by the SR policy, that is, performs step 301 on each candidate path.

In some embodiments, when allocating path identification information to each candidate path indicated by the SR policy, the control node allocates same path identification information to each candidate path. In a possible implementation, the control node allocates, by using step 301, path identification information to a candidate path indicated by the SR policy, and uses the path identification information allocated to the candidate path as the path identification information of each candidate path indicated by the SR policy. The control node may further use the path identification information of the candidate path as identification information of the SR policy. It may also be understood that the control node allocates the identification information to the SR policy by using step 301, and uses the identification information allocated to the SR policy as the path identification information of each candidate path indicated by the SR policy. For example, the control node uses 1000 as the BSID of each candidate path indicated by the SR policy, and uses 1000 as a BSID of the SR policy.

In some embodiments, when allocating path identification information to each candidate path indicated by the SR policy, the control node allocates different path identification information to each candidate path. In a possible implementation, the control node allocates, by using step 301, different path identification information to each candidate path indicated by the SR policy, and uses path identification information of an active candidate path indicated by the SR policy as the identification information of the SR policy. In this case, if a preference value of the path in the SR policy to which the path belongs is the highest in step 301, the path is an active candidate path indicated by the SR policy. The control node uses the path identification information of the path as the identification information of the SR policy. In other words, the path identification information of the path is the identification information of the SR policy to which the path belongs. For example, candidate paths indicated by the SR policy include candidate paths 1 to 3, and preference values of the candidate paths 1 to 3 in the SR policy are respectively 0.2, 0.3, and 0.5. In this case, the candidate path 3 is an active candidate path. If the control node uses 1000, 1001, and 1002 as BSIDs of the candidate paths 1 to 3, the control node further uses 1002 allocated to the candidate path 3 as the BSID of the SR policy.

302: The control node generates a PCEP packet. The PCEP packet includes the path identification information used to identify the path and indication information associated with the path identification information. The indication information indicates a forwarding node on the path to perform, based on the indication information when the forwarding node determines that the path identification information is unavailable, an operation associated with the path identification information.

The indication information is located in a reserved field in a BSID field in the PCEP packet. For example, the path identification information of the path is located in a binding value field in a TE-path-BSID TLV (BSID field) in the PCEP packet, and the indication information is located in a reserved field in the TE-path-BSID TLV. Because both the indication information and the path identification information are located in the TE-path-BSID TLV, the indication information is associated with the path identification information.

In some embodiments, the indication information is located in a reserved field in a common object header of the PCEP packet. In some other embodiments, the indication information is located in a flags field in the PCEP packet, for example, a flags field in an ISP object or a flags field in a header of the PCEP packet, provided that the indication information in the PCEP packet is associated with the path identity of the path. A location of the indication information in the PCEP packet is not specifically limited in this embodiment of this application.

The indication information occupies at least one bit. For example, if the indication information is 1, the indication information occupies 1 bit. In some embodiments, the indication information occupies a plurality of bits. For example, if the indication information is 11, the indication information occupies 2 bits. In some embodiments, if the indication information occupies a plurality of bits, the plurality of bits may include a valid flag bit. For example, the indication information occupies 2 bits, and the last bit in the 2 bits is a valid flag bit. If the valid flag bit is set to 0, the indication information is invalid. If the valid flag bit is set to 1, the indication information is valid.

If the indication information is first indication information, the operation associated with the path identification information includes a first operation. The first operation includes reallocating path identification information to the path. If the indication information is second indication information, the operation associated with the path identification information includes a second operation. The message indicates that an error occurs during allocation of the path identification information of the path. Alternatively, it may be understood that different types of indication information indicate the forwarding node to perform different operations. For example, the first indication information indicates to perform, when it is determined that the path identification information is unavailable, the first operation associated with the path identity. The second indication information indicates to perform, when it is determined that the path identification information is unavailable, the second operation associated with the path identity.

The first indication information and the second indication information are represented in different manners, to distinguish indication information of different indication types. For example, the first indication information is 1, and the second indication information is 0. If the indication information occupies 1 bit, 1 is directly used as the first indication information, and 0 is directly used as the second indication information. If the indication information occupies a plurality of bits (for example, 2 bits), when the first indication information is 10, it indicates that the first indication information is invalid, and when the first indication information is 11, it indicates that the first indication information is valid. Similarly, when the second indication information is 00, it indicates that the second indication information is invalid, and when the second indication information is 01, it indicates that the second indication information is valid. 0 and 1 are merely examples for ease of understanding the first indication information and the second indication information. The first indication information and the second indication information may also be represented in another manner. For example, 2-bit indication information may be used to represent four different indications, and each indication may correspond to a different detailed operation indication. Herein, a manner of representing the first indication information and the second indication information is not specifically limited in this embodiment of this application.

In some embodiments, whether a field in which the indication information is located exists in the PCEP packet may also indicate an operation to be performed by the forwarding node. For example, when the PCEP packet includes the field in which the indication information is located, but a manner of representing the indication information in the field is not limited, the forwarding node considers, by default, that the indication information in the field is the first indication information, and if the forwarding node determines that the path identification information of the path in the PCEP packet is unavailable, the forwarding node performs the first operation associated with the path identification information. For another example, when the PCEP packet does not include the field in which the indication information is located, the forwarding node considers, by default, that if the forwarding node determines that the path identification information of the path in the PCEP packet is unavailable, the forwarding node performs the second operation associated with the path identification information.

The control node generates the PCEP packet based on the path identification information allocated to the forwarding node and the indication information according to a packet format of the PCEP packet. For example, the path identification information is a BSID, and the indication information is the first indication information. A BSID allocated by the control node to the path is 1000, and the first indication information is marked as 1. The control node adds 1000 to the binding value field in the TE-path-BSID TLV in the PCEP packet according to the packet format of the PCEP packet, to indicate that the BSID of the path is 1000, and sets the last bit of the reserved field in the TE-path-BSID TLV to 1 as the first indication information. For example, FIG. 4 is a schematic diagram of a data format of the TE-path-BSID TLV according to an embodiment of this application. The control node generates the PCEP packet after adding content to each field of the PCEP packet.

In different application scenarios, packet types of PCEP packets generated by the control node are different. If the control node allocates the path identification information to the path for the first time, the control node adds a type identifier (for example, 12) of a PCInitiate packet to a message type field of the PCEP packet. In this case, the PCEP packet is a PCInitiate packet. If it is not the first time that the control node allocates the path identification information to the path, the control node adds a type identifier (for example, 11) of a PCUpd packet to the message type field of the PCEP packet. In this case, the PCEP packet is a PCUpd packet.

303: The control node sends the PCEP packet to the forwarding node on the path.

The forwarding node may be a head node of the path.

304: The forwarding node receives the PCEP packet.

305: The forwarding node determines that the path identification information of the path that is carried in the PCEP packet is unavailable.

After receiving the PCEP packet, the forwarding node obtains the path identification information of the path from the PCEP packet. For example, the forwarding node reads the path identification information 1000 from the binding value field of the TE-path-BSID TLV of the PCEP packet.

After the forwarding node obtains the path identification information from the PCEP packet, the forwarding node determines, by querying occupied path identification information, whether the path identification information is available. Alternatively, it may be understood as determining whether the path identification information can be used by the path. The occupied path identification information may be path identification information that is of each path to which path identification information has been allocated and that is stored in the forwarding node.

In some embodiments, the forwarding node queries whether the path identification information exists in the occupied path identification information. If the path identification information exists, it indicates that the path identification information is occupied by any path other than the path, and the forwarding node determines that the path identification is unavailable. Otherwise, it indicates that the path identity is not occupied by another path, and the forwarding node determines that the path identity is available.

In some other embodiments, the forwarding node performs verification on the path identification information based on a preset condition. If the path identification information does not meet the preset condition, the verification on the path identification information fails, and the forwarding node determines that the path identification information is unavailable. Otherwise, the forwarding node determines that the path identification information is available. The preset condition may include that the path identification information belongs to a path identification information range used when the forwarding node configures the path identification information for the path, or a data format of the path identification information is at least one of target data formats. For example, a path identification information range is set in each forwarding node, and the path identification information ranges that are set in the forwarding nodes may be the same or may be different. The path identification information range that is set in each forwarding node is a range interval used when each forwarding node configures path identification information of a path. If the path identification information is 1000, but a path identification information range set in the forwarding node is [2000, 3000], because the path identification information 1000 does not belong to [200, 3000], the forwarding node determines that the path identification information does not meet the preset condition, and the verification on the path identification information fails. For another example, if the data format of the path identification information is not the target data format, the forwarding node determines that the path identification information does not meet the preset condition and the verification on the path identification information fails.

It should be noted that, if the forwarding node determines that the path identification information is available, that is, determines that the path identification information can be used by the path, allocation of the path identification information of the path is completed, and the forwarding node may further store the path identification information in association with the path. A manner of storing the path identification information in association with the path may be the foregoing described manner of storing the path identification information in association with the path by the control node.

306: The forwarding node performs, based on the indication information, an operation associated with the path identification information.

According to the method provided in this embodiment of this application, the forwarding node on the path receives the PCEP packet, so that when determining that the path identification information of the path is unavailable, the forwarding node performs, based on the indication information in the PCEP packet, an operation associated with the path identification information, for example, determines, based on indicated content, that the forwarding node reallocates a path identity, or requests the control node to reallocate a path identity. This improves path identity allocation flexibility and efficiency.

Figure 5:
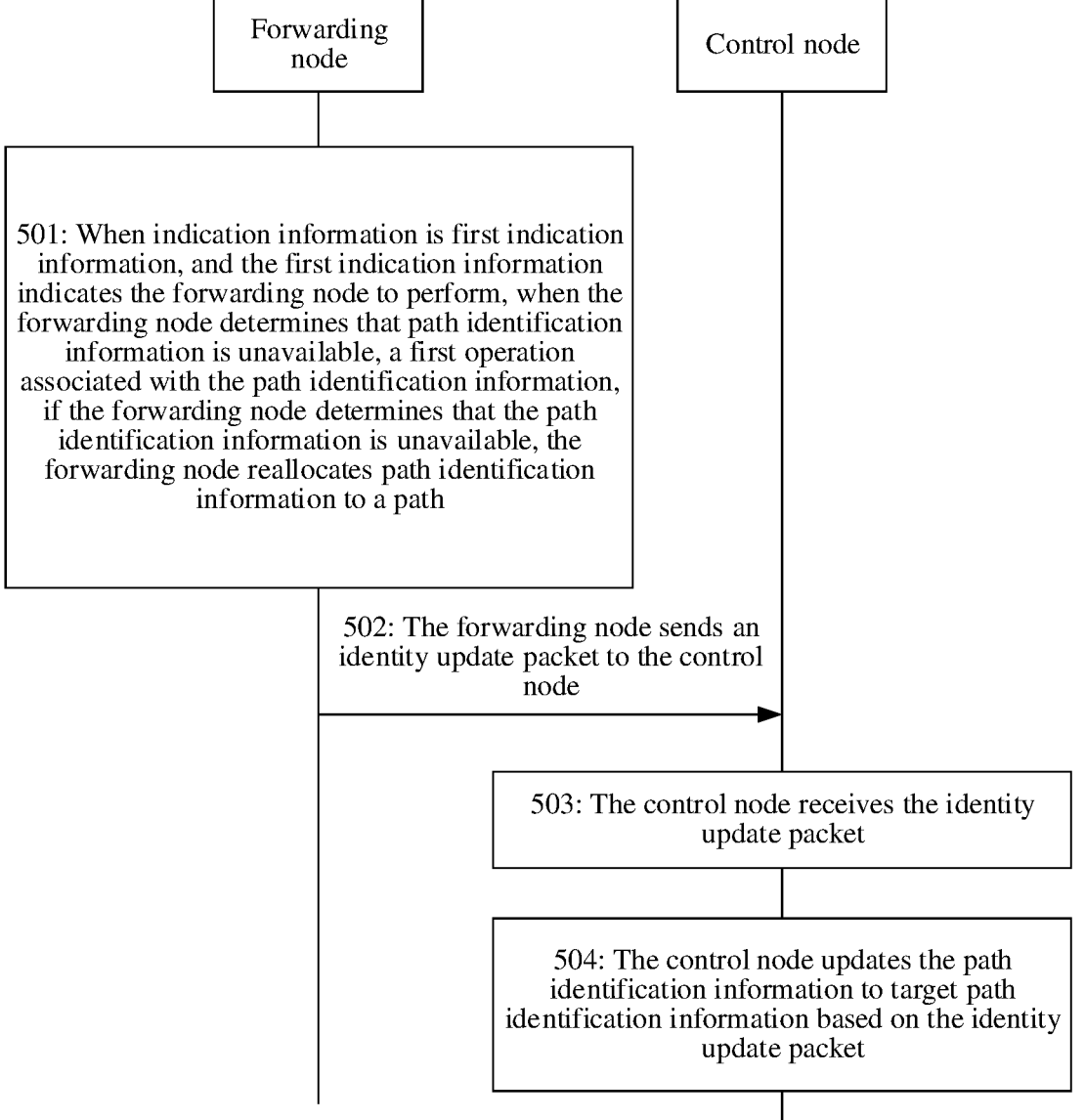
FIG. 5 is a flowchart of interaction between a forwarding node and a control node when indication information is first indication information according to an embodiment of this application.
Figures 6, 7:
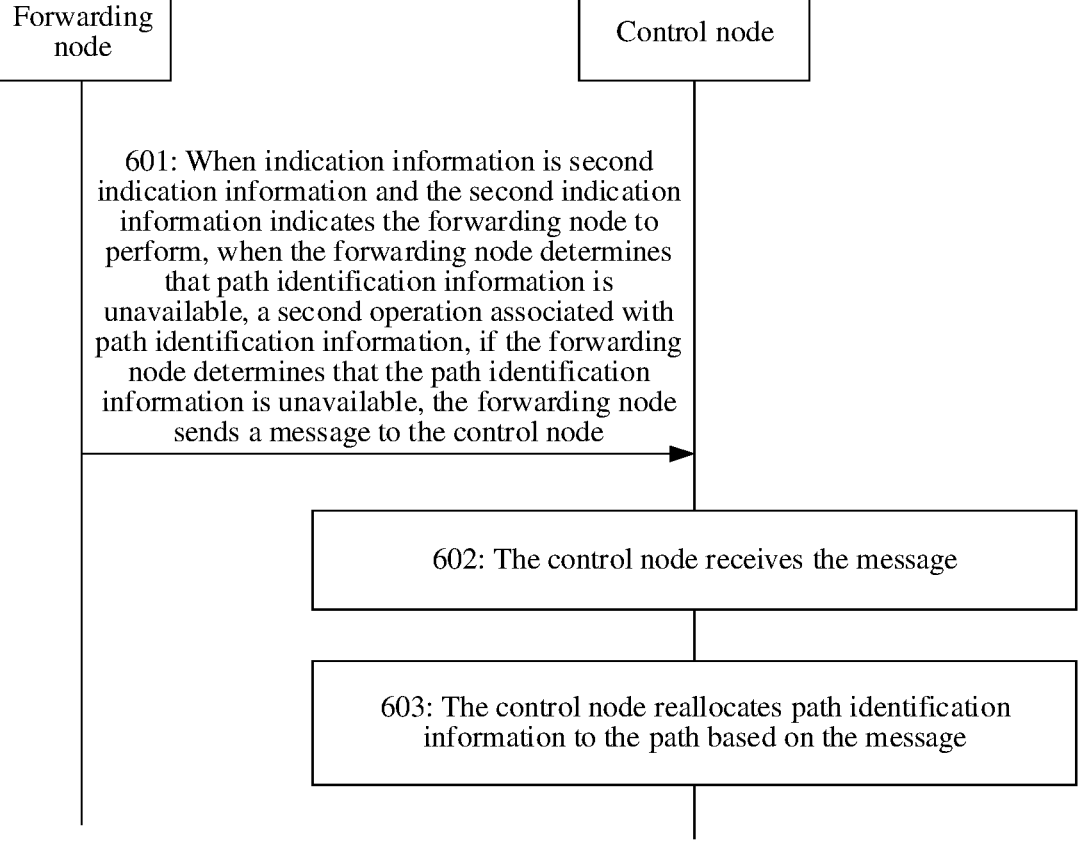
FIG. 6 is a flowchart of interaction between a forwarding node and a control node when indication information is second indication information according to an embodiment of this application.
FIG. 7 is a schematic diagram of a structure of a BSID field according to an embodiment of this application.

For step 306, when the forwarding node determines that the path identification information is unavailable, operations indicated by different types of indication information are different. To further reflect different operations performed by the forwarding node under different types of indication information, refer to the following implementation processes shown in FIG. 5 and FIG. 6. FIG. 5 is a flowchart of interaction between the forwarding node and the control node when the indication information is the first indication information according to an embodiment of this application. FIG. 6 is a flowchart of interaction between the forwarding node and the control node when the indication information is the second indication information according to an embodiment of this application.

The process shown in FIG. 5 may include steps 501 to 504.

501: When the indication information is the first indication information, and the first indication information indicates the forwarding node to perform, when the forwarding node determines that the path identification information is unavailable, the first operation associated with the path identification information, if the forwarding node determines that the path identification information is unavailable, the forwarding node reallocates path identification information to the path.

The first operation is to reallocate path identification information to the path. It may be understood that, when the indication information is the first indication information, and the operation is the first operation, the forwarding node has permission to allocate path identification information to the path.

When determining that the path identification information is unavailable, the forwarding node performs, based on an indication of the first indication information, the first operation associated with the path identification information. That is, the forwarding node reallocates path identification information to the path. A process in which the forwarding node reallocates the path identification information to the path is similar to the process in which the control node allocates the path identification information to the path in step 301. Herein, the process in which the forwarding node reallocates the path identification information to the path is not described again in this embodiment of this application.

It should be noted that the process shown in step 501 is a process in which when the indication information is the first indication information and the operation is the first operation, the forwarding node performs the first operation when determining that the path identification information is unavailable.

502: The forwarding node sends an identity update packet to the control node, where the identity update packet indicates to update the path identification information to target path identification information, and the target path identification information is the path identification information reallocated by the forwarding node to the path.

The identity update packet includes the target path identification information. In this case, the identity update packet or a data format of the identity update packet indicates to update the path identification information to the target path identification information. In a possible implementation, the identity update packet is a PCRpt packet. The forwarding node adds a type identifier (for example, 10) of the PCRpt packet to the message type field of the PCEP packet according to the packet format of the PCEP packet, and adds the target path identification information to the BSID field of the PCEP packet, to obtain the PCRpt packet (that is, the identity update packet). For example, FIG. 7 is a schematic diagram of a structure of the BSID field according to an embodiment of this application. If the target path identification information is a BSID, and a value of the BSID is 1001, the forwarding node may add 1001 to the binding value field in the BSID field, to indicate that a BSID reallocated by the forwarding node to the path is 1001.

In some embodiments, the identity update packet further includes an update identifier, and the update identifier indicates to update the path identification information to the target path identification information. In this case, the identity update packet and the update identifier may jointly indicate to update the path identification information to the target path identification information. In a possible implementation, the forwarding node generates the identity update packet based on the target path identification information and the update identifier, and sends the identity update packet to the control node, to indicate the control node to update the stored path identification information of the path to the target path identification information.

503: The control node receives the identity update packet.

504: The control node updates the path identification information to the target path identification information based on the identity update packet.

If the identity update packet is a PCRpt packet, or the identity update packet includes the update identifier, the control node learns that the forwarding node has reallocated one piece of target path identification information to the path. To ensure use consistency, the control node needs to update locally stored path identification information of the path to the target path identification information.

In a possible implementation, the control node may obtain the target path identification information from the identity update packet, search SR policies stored in the control node for an SR policy to which the path belongs, add the obtained target path identification information to the found SR policy, and associate the target path identification information with the path in the found SR policy, to update the path identification information allocated to the path to the target path identification information.

The process shown in 502 to 504 is a process in which the forwarding node sends the identity update packet to the control node, and the control node updates the locally stored path identification information of the path to the target path identification information based on the identity update packet. However, in some embodiments, the forwarding node does not send the identity update packet to the control node, but the forwarding node adds the target path identification information of the path to a locally stored SR policy to obtain a target SR policy, and sends the target SR policy to the control node. The control node searches for a locally stored SR policy to which the path belongs, and updates the found SR policy to the target SR policy. Because the control node finds that the SR policy includes the path identification information allocated by the control node to the path, and the target SR policy is the SR policy obtained after the path identification information is updated to the target path identity, the found SR policy is updated to the target SR policy, so that the path identification information allocated to the path is updated to the target path identification information.

According to the method provided in this embodiment of this application, if the indication information is the first indication information, and the operation is the first operation, when determining that the path identification information is unavailable, the forwarding node directly allocates new path identification information to the path, and does not need to request the control node to reallocate the path identification information. This reduces a quantity of interactions between the control node and the forwarding node, and improves path identity allocation efficiency.

A process shown in FIG. 6 may include steps 601 to 603.

601: When the indication information is the second indication information, and the second indication information indicates the forwarding node to perform, when the forwarding node determines that the path identification information is unavailable, the second operation associated with the path identification information, if the forwarding node determines that the path identification information is unavailable, the forwarding node sends a message to the control node, where the message indicates that an error occurs during allocation of the path identification information of the path.

The second operation is sending a message to the control node. Optionally, the message is a PCErr message. The message may include a SID list of the path and an error identifier, and the error identifier indicates that an error occurs during allocation of the path identification information of the path.

It should be noted that the process shown in step 601 is a process in which when the indication information is the second indication information and the operation is the second operation, the forwarding node performs the second operation when determining that the path identification information is unavailable.

It may be understood that when the indication information is the second indication information and the operation is the second operation, the forwarding node has no permission to allocate path identification information to the path. If the forwarding node determines that the path identification information that is of the path and that is delivered by the control node is unavailable, the forwarding node sends a message to the control node, to report an error, so that the control node subsequently allocates new path identification information to the forwarding node.

602: The control node receives the message.

603: The control node reallocates path identification information to the path based on the message.

After receiving the message, the control node learns, based on the SID list and the error identifier in the message, that an error occurs during previous allocation of the path identification information by the control node to the path, and the control node allocates new path identification information to the path. After the control node allocates the new path identification information to the path, the control node may search, by using the SID list, the locally stored path identification information of the path in the SR policy to which the path belongs, and update the found path identification information to the new path identification information.

It may be understood that, after receiving the message, the control node performs step 301, that is, performs the process shown in FIG. 3 again.

According to the method provided in this embodiment of this application, if the indication information is the second indication information, and the operation associated with the path identification information is the second operation, the forwarding node directly sends a message to the control node when determining that the path identification information is unavailable, and the control node allocates new path identification information to the path based on the message. This helps the control node maintain path identification information of all paths in a network.

The foregoing describes the method in embodiments of this application, and the following describes an apparatus in embodiments of this application. It should be understood that the apparatus described below have any functions of the forwarding node or the control node in the foregoing method.

Figure 8:
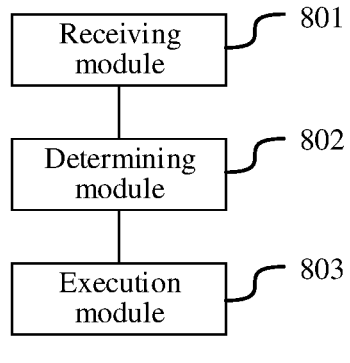
FIG. 8 is a schematic diagram of a structure of a path identity allocation apparatus according to an embodiment of this application.

FIG. 8 is a schematic diagram of a structure of a path identity allocation apparatus according to an embodiment of this application. The apparatus 800 is configured as a forwarding node on a path. The apparatus 800 includes: a receiving module 801, configured to perform step 304; a determining module 802, configured to perform step 305; and an execution module 803, configured to perform step 306.

Optionally, the determining module 802 is configured to: if the path identification information is already occupied by any path other than the path, determine that the path identification information is unavailable.

Optionally, the execution module 803 includes an allocation unit, and the allocation unit is configured to perform step 501.

Optionally, the execution module 803 further includes a sending unit, and the sending unit is configured to perform step 502 and step 601.

It should be understood that the apparatus 800 corresponds to the forwarding node in the method embodiments, and the modules and the other operations and/or functions in the apparatus 800 are separately used to implement various steps and methods implemented by the forwarding node in the method embodiments. For specific details, refer to the method embodiments. For brevity, details are not described herein again.

It should be understood that, when the apparatus 800 performs, based on an indication of the indication information, an operation associated with the path identification information, division into the foregoing function modules is merely used as an example for description. In actual application, the foregoing functions may be allocated to different function modules for implementation according to a requirement. That is, an internal structure of the apparatus 800 is divided into different function modules, to implement all or some of the functions described above. In addition, the apparatus 800 provided in the foregoing embodiment and the method embodiments belong to a same concept. For details about a specific implementation process of the apparatus 800, refer to the method embodiments. Details are not described herein again.

It should be understood that the apparatus 800 may be equivalent to the forwarding node 1011 in the system 100, or may be equivalent to an execution component in the forwarding node 1011.

Figure 9:
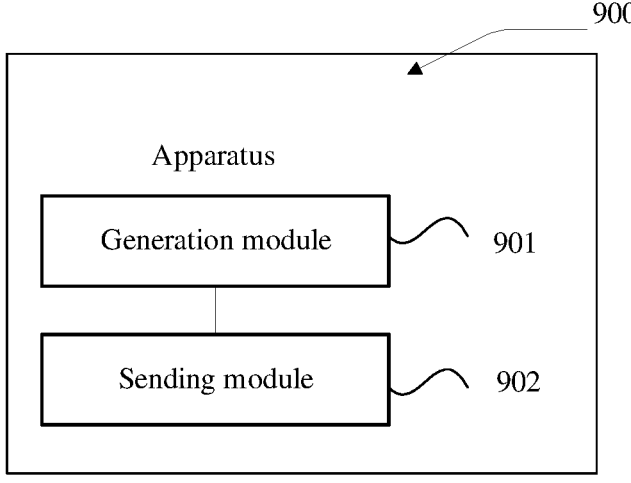
FIG. 9 is a schematic diagram of a structure of a path identity allocation apparatus according to an embodiment of this application.

FIG. 9 is a schematic diagram of a structure of a path identity allocation apparatus according to an embodiment of this application. As shown in FIG. 9, an apparatus 900 is configured as a control node. The apparatus 900 includes: a generation module 901, configured to perform step 302, and a sending module 902, configured to perform step 303.

Optionally, the generation module 901 is configured to: if it is detected that the forwarding node restarts due to a fault, generate the PCEP packet.

Optionally, the apparatus 900 further includes: a first receiving module, configured to perform step 602; and an allocation module, configured to perform step 301 or step 603.

Optionally, the apparatus 900 further includes: a second receiving module, configured to perform step 503; and an update module, configured to perform step 504.

It should be noted that the first receiving module and the second receiving module may be a same receiving module, or may be two submodules in a same receiving module, or may be two independent receiving modules. A location relationship between the first receiving module and the second receiving module is not specifically limited in this embodiment of this application.

It should be understood that the apparatus 900 corresponds to the control node in the method embodiments, and the modules and the other operations and/or functions in the apparatus 900 are separately used to implement various steps and methods implemented by the control node in the method embodiments. For specific details, refer to the method embodiments. For brevity, details are not described herein again.

It should be understood that when the apparatus 900 allocates the path identification information to the path and generates the PCEP packet, division into the foregoing function modules is merely used as an example for description. In actual application, the foregoing functions may be allocated to different function modules for implementation according to a requirement. That is, an internal structure of the apparatus 900 is divided into different function modules, to implement all or some of the functions described above. In addition, the apparatus 900 provided in the foregoing embodiment and the method embodiments belong to a same concept. For a specific implementation process of the apparatus 900, refer to the method embodiments. Details are not described herein again.

It should be understood that the apparatus 900 may be equivalent to the control node 1021 in the system 100, or may be equivalent to an execution component in the control node 1021.

In correspondence to the method embodiments and the virtual apparatus embodiments provided in this application, an embodiment of this application further provides a network device. The following describes a hardware structure of the network device.

A network device 1000 corresponds to the forwarding node in the method embodiments. Hardware, modules, and the other operations and/or functions in the network device 1000 are separately used to implement various steps and methods implemented by the forwarding node in the method embodiments. For details about how the network device 1000 performs, based on the indication information, an operation associated with path identification information, refer to the method embodiments. For brevity, details are not described herein again. Steps performed by the forwarding node in the method embodiments are implemented by using an integrated logic circuit of hardware or instructions in a form of software in a processor of the network device 1000. The steps performed by the forwarding node in the methods disclosed with reference to embodiments of this application may be directly performed by a hardware processor, or may be performed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The network device 1000 corresponds to the apparatus 800 in the virtual apparatus embodiments. All or some function modules in the apparatus 800 may be actually implemented by using software, hardware, or a combination of software and hardware in the network device 1000. Optionally, all or some function modules in the apparatus 800 are implemented by using software of the network device 1000. For example, the function modules included in the apparatus 800 may be generated after the processor of the network device 1000 reads program code stored in the memory.

Figure 10:
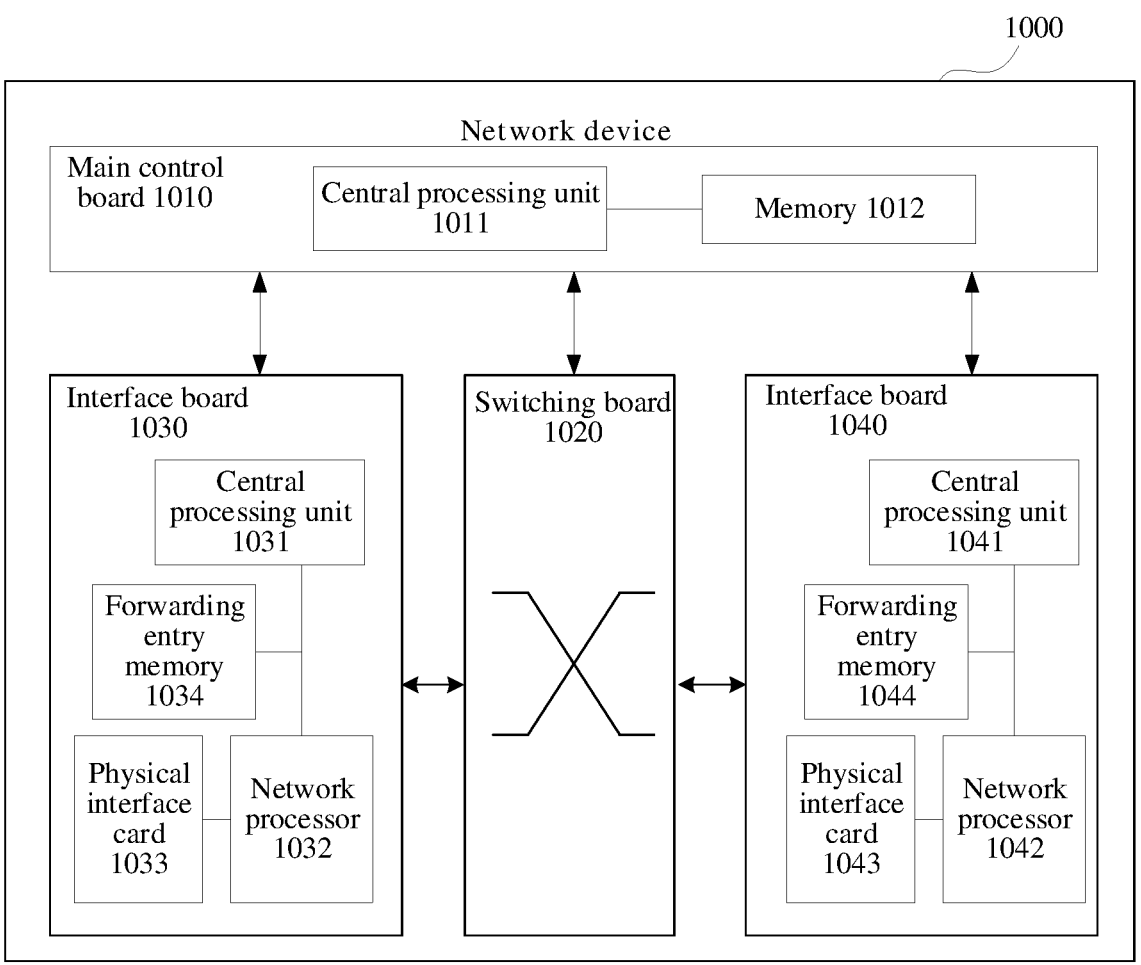
FIG. 10 is a schematic diagram of a structure of a network device according to an embodiment of this application.

FIG. 10 is a schematic diagram of a structure of a network device according to an embodiment of this application. The network device 1000 may be configured as a forwarding node on a path.

The network device 1000 includes a main control board 1010 and an interface board 1030.

The main control board 1010 is also referred to as a main processing unit (MPU) or a route processing card (route processor card). The main control board 1010 controls and manages components in the network device 1000, including functions such as routing calculation, device management, device maintenance, and protocol processing. The main control board 1010 includes a central processing unit 1011 and a memory 1012.

The interface board 1030 is also referred to as a line processing unit (LPU) card, a line card, or a service board. The interface board 1030 is configured to provide various service interfaces and forward a data packet. The service interface includes but is not limited to an Ethernet interface, a POS (packet over SONET/SDH) interface, and the like. The Ethernet interface is, for example, a flexible Ethernet service interface (flexible Ethernet clients, FlexE Clients). The interface board 1030 includes a central processing unit 1031, a network processor 1032, a forwarding entry memory 1034, and a physical interface card (PIC) 1033.

The central processing unit 1031 on the interface board 1030 is configured to: control and manage the interface board 1030, and communicate with the central processing unit 1011 on the main control board 1010.

The network processor 1032 is configured to forward a packet. A form of the network processor 1032 may be a forwarding chip. Specifically, processing on an uplink packet includes processing at a packet ingress interface and forwarding table lookup, and processing on a downlink packet includes forwarding table lookup and the like.

The physical interface card 1033 is configured to implement a physical layer interconnection function. Original traffic enters the interface board 1030 through the physical interface card 1033, and a processed packet is sent out through the physical interface card 1033. The physical interface card 1033 includes at least one physical interface. The physical interface is also referred to as a physical port. The physical interface card 1033, also referred to as a subcard, may be mounted on the interface board 1030, and is responsible for converting an optical/electrical signal into a packet, performing validity check on the packet, and forwarding the packet to the network processor 1032 for processing. In some embodiments, the central processing unit 1031 on the interface board 1003 may also perform a function of the network processor 1032, for example, implement software forwarding based on a general-purpose CPU, so that the network processor 1032 is not required in the physical interface card 1033.

Optionally, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

Optionally, the network device 1000 further includes a switching board 1020. The switching board 1020 may also be referred to as a switch fabric unit (switch fabric unit, SFU). When the network device 1000 includes a plurality of interface boards 1030, the switching board 1020 is configured to complete data exchange between the interface boards. For example, the interface board 1030 and the interface board 1040 may communicate with each other via the switching board 1020.

The main control board 1010 is coupled to the interface board 1030. For example, the main control board 1010, the interface board 1030, the interface board 1040, and the switching board 1020 are connected to a system backboard through a system bus. In this way, interworking is implemented. In a possible implementation, an inter-process communication (IPC) channel is established between the main control board 1010 and the interface board 1030, and the main control board 1010 communicates with the interface board 1030 through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1032 looks up the table, and forwards a packet received by the physical interface card 1033. The forwarding table delivered by the control plane may be stored in the forwarding entry memory 1034. In some embodiments, the control plane and the forwarding plane may be completely separated, and are not on a same device.

If the network device 1000 is configured as a forwarding node, when the forwarding node determines, based on indication information, that path identification information is unavailable, the central processing unit 1011 performs an operation associated with the path identification information. The network processor 1032 triggers the physical interface card 1033 to receive a PCEP packet, send a message, and send an identity update packet.

It should be understood that the receiving module 801 in the apparatus 800 is equivalent to the physical interface card 1033 or the physical interface card 1043 in the network device 1000. The determining module 802 and the execution module 803 in the apparatus 800 may be equivalent to the central processing unit 1011 or the central processing unit 1031 in the network device 1000.

It should be understood that an operation on the interface board 1040 is consistent with an operation on the interface board 1030 in this embodiment of this application. For brevity, details are not described again. It should be understood that the network device 1000 in this embodiment may correspond to the forwarding node in the method embodiments. The main control board 1010, the interface board 1030, and/or the interface board 1040 in the network device 1000 may implement the functions and/or the steps implemented by the forwarding node in the method embodiments. For brevity, details are not described herein again.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a weak data exchange and processing capability. A specific architecture that is to be used depends on a specific networking deployment scenario. This is not limited herein.

In correspondence to the method embodiments and the virtual apparatus embodiments provided in this application, an embodiment of this application further provides a control device. The following describes a hardware structure of the control device.

A control device 1100 corresponds to the control node in the method embodiments. The hardware, modules, and the other operations and/or functions in the control device 1100 are separately used to implement various steps and methods implemented by the control node in the method embodiments. For details about how the control device 1100 allocates path identification information to a path and generates a PCEP packet, refer to the method embodiments. For brevity, details are not described herein again. Steps in the method embodiments are implemented by using an integrated logic circuit of hardware or instructions in a form of software in a processor of the control device 1100. The steps of the method disclosed with reference to embodiments of this application may be directly performed by a hardware processor, or may be performed by using a combination of hardware and a software module in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The control device 1100 corresponds to the apparatus 900 in the virtual apparatus embodiments. All or some function modules in the apparatus 900 may be actually implemented by using software, hardware, or a combination of software and hardware in the control device 1100. Optionally, all or some function modules in the apparatus 900 are implemented by using software of the control device 1100. For example, the function modules included in the apparatus 900 may be generated after the processor of the control device 1100 reads program code stored in the memory.

Figure 11:
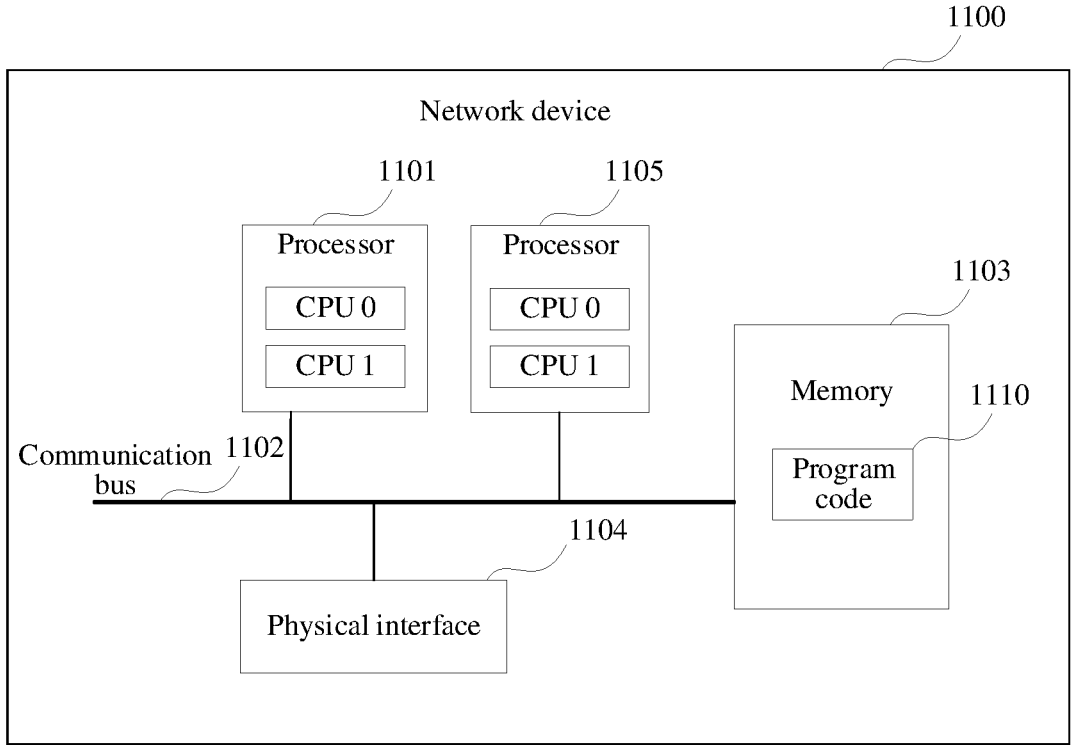
FIG. 11 is a schematic diagram of a structure of a control device according to an embodiment of this application.

FIG. 11 is a schematic diagram of a structure of a control device according to an embodiment of this application. The control device 1100 may be configured as a control node.

The control device 1100 includes at least one processor 1101, a communication bus 1102, a memory 1103, and at least one physical interface 1104.

The processor 1101 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The communication bus 1102 is configured to transmit information between the foregoing components. The communication bus 1102 may be classified into an address bus, a data bus, a control bus, and the like. For ease of representation, only one thick line is used to represent the bus in the figure, but this does not mean that there is only one bus or only one type of bus.

The memory 1103 may be a read-only memory (ROM) or another type of static storage device capable of storing static information and instructions, or may be a random access memory (RAM) or another type of dynamic storage device capable of storing information and instructions, or may be an electrically erasable programmable read-only memory (EE-PROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of an instruction or a data structure and capable of being accessed by a computer. This is not limited thereto. The memory 1103 may exist independently, and is connected to the processor 1101 through the communication bus 1102. Alternatively, the memory 1103 may be integrated with the processor 1101.

The physical interface 1104 is configured to communicate with another device or a communication network by using any apparatus such as a transceiver. The physical interface 1104 includes a wired communication interface, or may include a wireless communication interface. The wired communication interface may be, for example, an Ethernet interface. The Ethernet interface may be an optical interface, an electrical interface, or a combination thereof. The wireless communication interface may be, for example, a wireless local area network (WLAN) interface, a cellular network communication interface, or a combination thereof. The physical interface 1104 is also referred to as a physical port.

In specific implementation, in an embodiment, the processor 1101 may include one or more CPUs, for example, a CPU 0 and a CPU 1 shown in FIG. 11.

In specific implementation, in an embodiment, the control device 1100 may include a plurality of processors, for example, the processor 1101 and a processor 1105 shown in FIG. 11. Each of the processors may be a single-core processor (single-CPU) or may be a multi-core processor (multi-CPU). The processor herein may refer to one or more devices, circuits, and/or processing cores configured to process data (such as computer program instructions).

In specific implementation, in an embodiment, the control device 1100 may further include an output device 1106 and an input device 1107. The output device 1106 communicates with the processor 1101 and may display information in a plurality of manners. For example, the output device 1106 may be a liquid crystal display (LCD), a light emitting diode (LED) display device, a cathode ray tube (CRT) display device, or a projector. The input device 1107 communicates with the processor 1101, and may receive an input from a user in a plurality of manners. For example, the input device 1107 may be a mouse, a keyboard, a touchscreen device, or a sensor device.

In some embodiments, the memory 1103 is configured to store program code 1110 for executing the solutions of this application, and the processor 1101 may execute the program code 1110 stored in the memory 1103 to implement a corresponding function. For example, the program stored in the program code 1110 may be invoked to implement functions of the generation module 901, the allocation module, and the update module in the apparatus 900. In other words, the control device 1100 may implement, by using the processor 1101 and the program code 1110 in the memory 1103, the method provided in the method embodiments.

The control device 1100 in this embodiment of this application may correspond to the control node in the method embodiments. In addition, the processor 1101, the physical interface 1104, and the like in the control device 1100 may implement functions of the control node and/or various steps and methods implemented by the control node in the method embodiments. For brevity, details are not described herein again.

In some embodiments, the generation module 901, the allocation module, and the update module in the apparatus 900 may be equivalent to the processor 1101 in the control device 1100. The sending module 902, the first receiving module, and the second receiving module in the apparatus 900 are equivalent to the physical interface 1104 in the control device 1100.

In some possible embodiments, the forwarding node or the control node may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a forwarding node or control node. For example, the forwarding node or the control node may be implemented based on a general-purpose physical server with reference to the network functions virtualization (NFV) technology. The forwarding node or the control node is a virtual host, a virtual router, or a virtual switch. After reading this application, with reference to the NFV technology, a person skilled in the art may virtualize a forwarding node or a control node that has the foregoing functions on a universal physical server. Details are not described herein.

It should be understood that the network devices in the various product forms each have any function of the forwarding node or the control node in the method embodiments. Details are not described herein again.

An embodiment of this application provides a computer program product. When the computer program product runs on a network device, the network device is enabled to perform the method performed by the forwarding node in the method embodiments.

An embodiment of this application provides a computer program product. When the computer program product runs on a control device, the network device is enabled to perform the method performed by the control node in the method embodiments.

An embodiment of this application further provides a chip, including a processor and an interface circuit. The interface circuit is configured to receive instructions and transmit the instructions to the processor. The processor may be configured to perform the path identity allocation method performed by the forwarding node or the control node. The processor is coupled to a memory, the memory is configured to store a program or instructions, and when the program or the instructions are executed by the processor, the chip system is enabled to implement the method in any one of the method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application specific integrated chip (ASIC), a system chip (SoC), a CPU, an NP, a digital signal processing circuit (DSP), a micro controller unit (MCU), a programmable logic device (PLD), or another integrated chip.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, performed by a forwarding node on a path, the method comprising:
   receiving a path computation element protocol (PCEP) packet, wherein the PCEP packet comprises path identification information identifying the path and indication information associated with the path identification information, wherein the indication information is located in a reserved field in the PCEP packet or a flags field in the PCEP packet; and
   determining that the path identified by the path identification information is unavailable, and performing, based on the indication information, an operation associated with the path identification information.

2. The method according to claim 1, wherein the indication information is first indication information, the operation associated with the path identification information comprises a first operation, and the first operation comprises reallocating new path identification information to the path.

3. The method according to claim 2, wherein after performing, based on the indication information, the operation associated with the path identification information, the method further comprises:
   sending an identity update packet to a control node, wherein the identity update packet indicates to update the path identification information to target path identification information, and the target path identification information is the new path identification information reallocated by the forwarding node to the path.

4. The method according to claim 1, wherein the indication information is second indication information, the operation associated with the path identification information comprises a second operation, the second operation comprises sending a message to a control node, and the message indicates that an error occurs during allocation of the path identified by the path identification information of the path.

5. The method according to claim 1, wherein the path identification information comprises a binding segment identity (BSID) of the path.

6. The method according to claim 5, wherein the reserved field is located in a BSID field in the PCEP packet.

7. The method according to claim 1, wherein the indication information is located in the flags field in the PCEP packet.

8. The method according to claim 1, wherein the indication information occupies at least one bit.

9. The method according to claim 1, wherein the PCEP packet comprises any one of a path computation label switching path initiate (PCInitiate) packet or a path computation update request (PCUpd) packet.

10. The method according to claim 1, wherein the path is a path indicated by a segment routing (SR) policy, and the SR policy comprises any one of a segment routing traffic engineering (SR TE) policy or a segment routing over internet protocol version 6 (SRv6) policy.

11. The method according to claim 10, wherein the path is a candidate path.

12. The method according to claim 11, wherein the path identification information is identification information of the SR policy or identification information of the candidate path.

13. The method according to claim 1, wherein determining that the path identified by the path identification information is unavailable comprises:

when the path identified by the path identification information is already occupied by any path other than the path identified by the path identification information, determining that the path identified by the path identification information is unavailable.

14. The method according to claim 1, wherein the forwarding node is a head node of the path.

15. A method, performed by a control node, the method comprising:

generating a path computation element protocol (PCEP) packet, wherein the PCEP packet comprises path identification information identifying a path and indication information associated with the path identification information, the indication information is located in a reserved field in the PCEP packet or a flags field in the PCEP packet, and the indication information indicates to a forwarding node on the path to perform, based on the indication information when the forwarding node determines that the path identified by the path identification information is unavailable, an operation associated with the path identification information; and sending the PCEP packet to the forwarding node.

16. The method according to claim 15, wherein generating the PCEP packet comprises:

when it is detected that the forwarding node restarts due to a fault, generating the PCEP packet.

17. The method according to claim 15, wherein after sending the PCEP packet to the forwarding node, the method further comprises:

receiving an identity update packet, wherein the identity update packet indicates to update the path identification information to target path identification information, and the target path identification information is new path identification information reallocated by the forwarding node to the path; and updating the path identification information of the path to the target path identification information based on the identity update packet.

18. The method according to claim 15, wherein after sending the PCEP packet to the forwarding node, the method further comprises:

receiving a message, wherein the message indicates that an error occurs during allocation of the path identification information of the path; and reallocating the path identification information to the path based on the message.

19. The method according to claim 15, wherein the indication information is first indication information, the operation associated with the path identification information comprises a first operation, and the first operation comprises reallocating new path identification information to the path.

20. The method according to claim 15, wherein the indication information is second indication information, the operation associated with the path identification information comprises a second operation, the second operation comprises sending a message to the control node, and the message indicates that an error occurs during allocation of the path identification information of the path.

21. An apparatus, wherein the apparatus is configured as a forwarding node on a path, and the apparatus comprises:

at least one non-transitory memory storing instructions; and at least one processor coupled to the at least one non-transitory memory, wherein the instructions, when executed by the at least one processor, cause the apparatus to:

receive a path computation element protocol (PCEP) packet, wherein the PCEP packet comprises path identification information identifying the path and indication information associated with the path identification information, and the indication information is located in a reserved field in the PCEP packet or a flags field in the PCEP packet;

determine that the path identified by the path identification information is unavailable; and perform, based on the indication information, an operation associated with the path identification information.

22. The apparatus according to claim 21, wherein the indication information is first indication information, the operation associated with the path identification information comprises a first operation, and the first operation comprises reallocating new path identification information to the path.

23. The apparatus according to claim 22, wherein the instructions, when executed by the processor, further cause the apparatus to:

send an identity update packet to a control node, wherein the identity update packet indicates to update the path identification information to target path identification information, and the target path identification information is the new path identification information reallocated by the forwarding node to the path.

24. The apparatus according to claim 21, wherein the indication information is second indication information, the operation associated with the path identification information comprises a second operation, the second operation comprises sending a message to a control node, and the message indicates that an error occurs during allocation of the path identification information of the path.

25. The apparatus according to claim 21, wherein the path identification information comprises a binding segment identity (BSID) of the path.

26. An apparatus, wherein the apparatus is configured as a control node, and the apparatus comprises:

at least one non-transitory memory storing instructions; and at least one processor coupled to the at least one non-transitory memory, wherein the instructions, when executed by the at least one processor, cause the apparatus to:

generate a path computation element protocol (PCEP) packet, wherein the PCEP packet comprises path identification information identifying a path and indication information associated with the path identification information, the indication information is located in a reserved field in the PCEP packet or a flags field in the PCEP packet, and the indication information indicates to a forwarding node on the path to perform, based on the indication information when the forwarding node determines that the path identified by the path identification information is unavailable, an operation associated with the path identification information; and send the PCEP packet to the forwarding node.

27. The apparatus according to claim 26, wherein the instructions, when executed by the processor, further cause the apparatus to:

when it is detected that the forwarding node restarts due to a fault, generate the PCEP packet.

28. The apparatus according to claim 26, wherein the instructions, when executed by the processor, further cause the apparatus to:

receive an identity update packet, wherein the identity update packet indicates to update the path identification information to target path identification information, and the target path identification information is new path identification information reallocated by the for- warding node to the path; and update the path identification information of the path to the target path identification information based on the identity update packet.

29. The apparatus according to claim 26, wherein the instructions, when executed by the processor, further cause the apparatus to:

receive a message, wherein the message indicates that an error occurs during allocation of the path identification information of the path; and reallocate new path identification information to the path based on the message.

30. The apparatus according to claim 26, wherein the indication information is first indication information, the operation associated with the path identification information comprises a first operation, and the first operation comprises reallocating new path identification information to the path.

* * * * *